(12) United States Patent
Watson et al.

(10) Patent No.: US 8,287,050 B2
(45) Date of Patent: Oct. 16, 2012

(54) METHOD OF INCREASING RESERVOIR PERMEABILITY

(75) Inventors: John David Watson, Evergreen, CO (US); Michael Helmut Kobler, Sebastopol, CA (US); Dana Brock, Sebastopol, CA (US)

(73) Assignee: OSUM Oil Sands Corp. (CA)

( * ) Notice: Subject to any disclaimer, the term of this patent is extended or adjusted under 35 U.S.C. 154(b) by 1407 days.

(21) Appl. No.: 11/488,985

(22) Filed: Jul. 17, 2006

(65) Prior Publication Data

US 2007/0039729 A1   Feb. 22, 2007

Related U.S. Application Data

(60) Provisional application No. 60/753,694, filed on Dec. 23, 2005, provisional application No. 60/700,387, filed on Jul. 18, 2005.

(51) Int. Cl.
*E21C 41/00* (2006.01)

(52) U.S. Cl. .......................................................... 299/2

(58) Field of Classification Search .......... 405/138–147; 299/2–6, 16, 17
See application file for complete search history.

(56) References Cited

U.S. PATENT DOCUMENTS

| | | | |
|---|---|---|---|
| 604,330 A | 5/1898 | Kibling | |
| 1,520,737 A | 12/1924 | Wright | |
| 1,660,187 A | 2/1928 | Ehrat | |
| 1,722,679 A | 7/1929 | Ranney | |
| 1,936,643 A | 10/1929 | Reed | |
| 1,735,012 A | 11/1929 | Rich | |
| 1,735,481 A | 11/1929 | Uren | |
| 1,811,560 A | 6/1931 | Ranney | |
| 1,812,305 A | 6/1931 | Ranney | |
| 1,816,260 A | 7/1931 | Lee | |
| 1,852,717 A | 4/1932 | Grinnell et al. | |
| 1,884,859 A | 10/1932 | Ranney | |
| 1,910,762 A | 5/1933 | Grinnell et al. | |
| 1,935,643 A * | 11/1933 | Laughlin | 299/2 |
| 2,148,327 A | 2/1939 | Smith et al. | |
| 2,193,219 A | 3/1940 | Bowie et al. | |
| 2,200,665 A | 5/1940 | Bolton | |
| 2,210,582 A | 8/1940 | Grosse et al. | |
| 2,365,591 A | 12/1944 | Ranney | |
| 2,670,801 A | 3/1954 | Sherborne | |
| 2,783,986 A | 3/1957 | Nelson et al. | |
| 2,786,660 A | 3/1957 | Alleman | |
| 2,799,641 A | 7/1957 | Bell | |
| 2,857,002 A | 10/1958 | Pevere et al. | |

(Continued)

FOREIGN PATENT DOCUMENTS

CA    986146    3/1976

(Continued)

OTHER PUBLICATIONS

"Plan of Operation, Shell Frontier Oil and Gas Inc., E-ICP Test Project", Oil Shale Research and Development Project, Prepared for Bureau of Land Management, Feb. 15, 2006, pp. 1-70.

(Continued)

*Primary Examiner* — Sunil Singh
(74) *Attorney, Agent, or Firm* — Sheridan Ross P.C.

(57) ABSTRACT

In one configuration, the present invention is directed to a method and system for extracting hydrocarbons from a hydrocarbon-containing deposit. One or more underground excavations designed to at least partially cave in are used to increase the permeability of the deposit.

8 Claims, 16 Drawing Sheets

U.S. PATENT DOCUMENTS

| | | | |
|---|---|---|---|
| 2,858,676 A | 11/1958 | Ross |
| 2,888,987 A | 6/1959 | Parker |
| 2,914,124 A | 11/1959 | Ripley, Jr. |
| 2,989,294 A | 6/1961 | Coker |
| 3,017,168 A | 1/1962 | Carr |
| 3,024,013 A | 3/1962 | Rogers et al. |
| 3,034,773 A | 5/1962 | Legatski |
| 3,207,221 A | 9/1965 | Cochran et al. |
| 3,227,229 A | 1/1966 | Wakefield, Jr. |
| 3,259,186 A | 7/1966 | Dietz |
| 3,285,335 A | 11/1966 | Reistle, Jr. |
| 3,333,637 A | 8/1967 | Prats |
| 3,338,306 A | 8/1967 | Cook |
| 3,353,602 A | 11/1967 | Geertsma |
| 3,386,508 A | 6/1968 | Bielstein et al. |
| 3,455,392 A | 7/1969 | Prats |
| 3,456,730 A | 7/1969 | Lange |
| 3,474,863 A | 10/1969 | Deans et al. |
| 3,530,939 A | 9/1970 | Turner et al. |
| 3,613,806 A | 10/1971 | Malott |
| 3,620,313 A | 11/1971 | Elmore et al. |
| 3,678,694 A | 7/1972 | Haspert |
| 3,768,559 A | 10/1973 | Allen et al. |
| 3,778,107 A | 12/1973 | Haspert |
| 3,784,257 A | 1/1974 | Lauber et al. |
| 3,838,738 A | 10/1974 | Redford et al. |
| 3,882,941 A | 5/1975 | Pelofsky |
| 3,884,261 A | 5/1975 | Clynch |
| 3,888,543 A | 6/1975 | Johns |
| 3,922,287 A | 11/1975 | Pawson et al. |
| 3,924,895 A | 12/1975 | Leasure |
| 3,937,025 A | 2/1976 | Alvarez-Calderone |
| 3,941,423 A | 3/1976 | Garte |
| 3,948,323 A | 4/1976 | Sperry et al. |
| 3,954,140 A | 5/1976 | Hendrick |
| 3,957,308 A * | 5/1976 | Lambly et al. ................. 299/14 |
| 3,960,408 A | 6/1976 | Johns |
| 3,986,557 A | 10/1976 | Striegler et al. |
| 3,992,287 A | 11/1976 | Rhys |
| 4,046,191 A | 9/1977 | Neath |
| 4,055,959 A | 11/1977 | Fritz |
| 4,064,942 A | 12/1977 | Prats |
| 4,067,616 A | 1/1978 | Smith et al. |
| 4,072,018 A | 2/1978 | Alvarez-Calderon |
| 4,076,311 A | 2/1978 | Johns |
| 4,085,803 A | 4/1978 | Butler |
| 4,099,388 A | 7/1978 | Husemann et al. |
| 4,099,570 A | 7/1978 | Vandergrift |
| 4,099,783 A | 7/1978 | Verty et al. |
| 4,106,562 A | 8/1978 | Barnes et al. |
| 4,116,011 A | 9/1978 | Girault |
| 4,116,487 A | 9/1978 | Yamazaki et al. |
| 4,152,027 A | 5/1979 | Fujimoto et al. |
| 4,160,481 A | 7/1979 | Turk et al. |
| 4,165,903 A | 8/1979 | Cobbs |
| 4,167,290 A | 9/1979 | Yamazaki et al. |
| 4,185,693 A | 1/1980 | Crumb et al. |
| 4,203,626 A | 5/1980 | Hamburger |
| 4,209,268 A | 6/1980 | Fujiwara et al. |
| 4,211,433 A | 7/1980 | Pedersen |
| 4,216,999 A | 8/1980 | Hanson |
| 4,224,988 A | 9/1980 | Gibson et al. |
| 4,227,743 A * | 10/1980 | Ruzin et al. ........................ 299/2 |
| 4,236,640 A | 12/1980 | Knight |
| 4,249,777 A | 2/1981 | Morrell et al. |
| 4,257,650 A | 3/1981 | Allen |
| 4,279,743 A | 7/1981 | Miller |
| 4,285,548 A * | 8/1981 | Erickson .......................... 299/2 |
| 4,289,354 A | 9/1981 | Zakiewicz |
| 4,296,969 A | 10/1981 | Willman |
| 4,406,499 A | 9/1983 | Yildirim |
| 4,434,849 A | 3/1984 | Allen |
| 4,440,449 A | 4/1984 | Sweeney |
| 4,445,723 A | 5/1984 | McQuade |
| 4,455,216 A | 6/1984 | Angevine et al. |
| 4,456,305 A | 6/1984 | Yoshikawa |
| 4,458,945 A | 7/1984 | Ayler et al. |
| 4,458,947 A | 7/1984 | Hopley et al. |
| 4,463,988 A | 8/1984 | Bouck et al. |
| 4,486,050 A | 12/1984 | Snyder |
| 4,494,799 A | 1/1985 | Snyder |
| 4,502,733 A | 3/1985 | Grubb |
| 4,505,516 A | 3/1985 | Shelton |
| 4,533,182 A | 8/1985 | Richards |
| 4,536,035 A | 8/1985 | Huffman et al. |
| 4,565,224 A | 1/1986 | Keller |
| 4,575,280 A | 3/1986 | Hemphill et al. |
| 4,595,239 A | 6/1986 | Ayler et al. |
| 4,601,607 A | 7/1986 | Lehmann |
| 4,603,909 A | 8/1986 | LeJeune |
| 4,607,888 A | 8/1986 | Trent et al. |
| 4,607,889 A | 8/1986 | Hagimoto et al. |
| 4,611,855 A | 9/1986 | Richards |
| 4,699,709 A | 10/1987 | Peck |
| 4,774,470 A | 9/1988 | Takigawa et al. |
| 4,793,736 A | 12/1988 | Thompson et al. |
| 4,808,030 A | 2/1989 | Takegawa |
| 4,856,936 A | 8/1989 | Hentschel et al. |
| 4,858,882 A | 8/1989 | Beard et al. |
| 4,911,578 A | 3/1990 | Babendererde |
| 4,946,579 A | 8/1990 | Ocelli |
| 4,946,597 A | 8/1990 | Sury |
| 4,983,077 A | 1/1991 | Sorge et al. |
| 5,016,710 A | 5/1991 | Renard et al. |
| 5,032,039 A | 7/1991 | Hagimoto et al. |
| 5,051,033 A | 9/1991 | Grotenhofer |
| 5,125,719 A | 6/1992 | Snyder |
| 5,141,363 A | 8/1992 | Stephens |
| 5,174,683 A | 12/1992 | Grandori |
| 5,205,613 A | 4/1993 | Brown, Jr. |
| 5,211,510 A | 5/1993 | Kimura et al. |
| 5,217,076 A * | 6/1993 | Masek ........................... 166/303 |
| 5,249,844 A | 10/1993 | Gronseth |
| 5,255,960 A * | 10/1993 | Ilomaki .......................... 299/56 |
| 5,284,403 A * | 2/1994 | Ilomaki ......................... 405/141 |
| 5,316,664 A | 5/1994 | Gregoli et al. |
| 5,330,292 A * | 7/1994 | Sakanishi et al. ............. 405/141 |
| 5,339,898 A | 8/1994 | Yu et al. |
| 5,354,359 A | 10/1994 | Wan et al. |
| 5,446,980 A | 9/1995 | Rocke |
| 5,472,049 A | 12/1995 | Chaffee et al. |
| 5,484,232 A | 1/1996 | Hayashi et al. |
| 5,534,136 A | 7/1996 | Rosenbloom |
| 5,534,137 A | 7/1996 | Griggs et al. |
| 5,655,605 A | 8/1997 | Matthews |
| 5,697,676 A | 12/1997 | Kashima et al. |
| 5,767,680 A | 6/1998 | Torres-Verdin et al. |
| 5,785,736 A | 7/1998 | Thomas et al. |
| 5,831,934 A | 11/1998 | Gill et al. |
| 5,846,027 A | 12/1998 | Fujii |
| 5,852,262 A | 12/1998 | Gill et al. |
| 5,879,057 A | 3/1999 | Schwoebel et al. |
| 5,890,771 A | 4/1999 | Cass |
| 6,003,953 A | 12/1999 | Huang et al. |
| 6,017,095 A | 1/2000 | DiMillo |
| 6,027,175 A | 2/2000 | Seear et al. |
| 6,206,478 B1 | 3/2001 | Uehara et al. |
| 6,230,814 B1 | 5/2001 | Nasr et al. |
| 6,257,334 B1 | 7/2001 | Cyr et al. |
| 6,263,965 B1 | 7/2001 | Schmidt et al. |
| 6,277,286 B1 | 8/2001 | Søntvedt et al. |
| 6,364,418 B1 | 4/2002 | Schwoebel |
| 6,412,555 B1 | 7/2002 | Sten-Halvorsen et al. |
| 6,510,897 B2 | 1/2003 | Hemphill |
| 6,554,368 B2 | 4/2003 | Drake et al. |
| 6,569,235 B2 | 5/2003 | Carter, Jr. |
| 6,591,908 B2 | 7/2003 | Nasr |
| 6,604,580 B2 | 8/2003 | Zupanick et al. |
| 6,631,761 B2 | 10/2003 | Yuan et al. |
| 6,662,872 B2 | 12/2003 | Gutek et al. |
| 6,679,326 B2 | 1/2004 | Zakiewicz |
| 6,705,401 B2 | 3/2004 | Buckle et al. |
| 6,708,759 B2 | 3/2004 | Leaute et al. |
| 6,758,289 B2 | 7/2004 | Kelley et al. |
| 6,796,381 B2 | 9/2004 | Ayler et al. |
| 6,857,487 B2 | 2/2005 | Galloway et al. |
| 6,869,147 B2 | 3/2005 | Drake et al. |

| | | | |
|---|---|---|---|
| 6,880,633 | B2 | 4/2005 | Wellington et al. |
| 6,929,330 | B2 | 8/2005 | Drake et al. |
| 6,997,256 | B2 | 2/2006 | Williams et al. |
| 7,066,254 | B2 | 6/2006 | Vinegar et al. |
| 7,097,255 | B2 | 8/2006 | Drake et al. |
| 7,128,375 | B2 | 10/2006 | Watson |
| 7,163,063 | B2 * | 1/2007 | Seams ............................ 166/370 |
| 7,185,707 | B1 | 3/2007 | Graham |
| 7,192,092 | B2 | 3/2007 | Watson |
| 7,240,730 | B2 | 7/2007 | Williams et al. |
| 7,419,223 | B2 | 9/2008 | Seams |
| 7,464,756 | B2 | 12/2008 | Gates et al. |
| 7,641,756 | B2 | 1/2010 | Schwert |
| 7,757,784 | B2 | 7/2010 | Fincher et al. |
| 2002/0015619 | A1 | 2/2002 | Stephens |
| 2003/0160500 | A1 | 8/2003 | Drake et al. |
| 2004/0211559 | A1 | 10/2004 | Nguyen et al. |
| 2005/0051362 | A1 | 3/2005 | McGuire et al. |
| 2005/0093361 | A1 | 5/2005 | Drake et al. |
| 2007/0044957 | A1 | 3/2007 | Watson |
| 2007/0085409 | A1 | 4/2007 | Drake et al. |
| 2008/0017416 | A1 | 1/2008 | Watson et al. |
| 2008/0078552 | A1 | 4/2008 | Donnelly et al. |
| 2008/0087422 | A1 | 4/2008 | Kobler et al. |
| 2008/0122286 | A1 | 5/2008 | Brock et al. |
| 2009/0084707 | A1 | 4/2009 | Gil |
| 2010/0276140 | A1 | 11/2010 | Edmunds et al. |
| 2011/0120709 | A1 | 5/2011 | Nasr et al. |
| 2012/0132424 | A1 | 5/2012 | Watson et al. |

FOREIGN PATENT DOCUMENTS

| | | |
|---|---|---|
| CA | 986544 | 3/1976 |
| CA | 1165712 | 4/1984 |
| CA | 1167238 | 5/1984 |
| CA | 1289057 | 9/1991 |
| CA | 2124199 | 6/1992 |
| CA | 2222668 | 5/1998 |
| CA | 2340506 | 9/2001 |
| CA | 2526854 | 9/2001 |
| CA | 2583508 | 9/2001 |
| CA | 2583513 | 9/2001 |
| CA | 2583519 | 9/2001 |
| CA | 2583523 | 9/2001 |
| CA | 2358805 | 10/2001 |
| CA | 2315596 | 2/2002 |
| CA | 2332207 | 2/2002 |
| JP | 03-267497 | 11/1991 |
| JP | 04-044514 A | 2/1992 |
| JP | 04-312697 | 11/1992 |
| WO | WO 01/69042 A1 | 9/2001 |
| WO | WO 02/45682 | 6/2002 |

OTHER PUBLICATIONS

K. Li et al., "Prediction of Oil Production by Gravity Drainage", Stanford University, SPE 84 184 (Oct. 2003).

R.M. Butler, "Thermal Recovery of Oil and Bitumen", ISBN 0-9682563-0-9, 2nd Printing by GravDrain, Inc., Calgary, Alberta (1998) (Parts 1-8).

"Mining for Petroleum: Feasibility Study", Energy Development Consultants, Inc., US Bureau of Mines Contract No. JO275002 (Jul. 1978).

Piper et al, "An Evaluation of Heavy Oil Mining", Energy Dvpmnt Consultants/Stone & Webster Engineering Corp, Dept of Energy Contract DE-AC03-80PC30259 (Dec. 1982) (Parts 1-3).

R.C. Fontaine et al., "An Evaluation of Oil Mining in the State of Ohio Phase II", Stone & Webster Engineering Corp. (Sep. 1983).

"Future of Oil Recovery From Underground Drill Sites", Underground Technology Research Council, Committee on Mine Assisted Oil Recovery (Dec. 1988).

A.W. Riddell, "Oil Mining A Review of Projects" (Jun. 1984).

J.S. Hutchins et al., "Oil Mining: An Emerging Technology", Mining Engineering (Dec. 1981).

R.A. Dick et al., "Oil Mining", US Bureau of Mines (1980) (best available copy).

"Oil Mining: The Fourth Order of Oil Recovery", Compressed Air magazine (Dec. 1983).

W.F. Dobson et al., "Mining Technology Assists Oil Recovery from Wyoming Field", Journal of Petroleum Technology, from Soc. Pet. Eng. (Apr. 1981).

R.C. Fontaine, "Recommended Reservoir Engineering Testing Program for Oil Mining Projects", Stone & Webster Engineering Corp. (Jan. 1984).

O'Rourke et al., "AOSTRA's Underground Test Facility (UTF): Mine-Assisted Recovery Under Difficult Conditions", CIM Bulletin, vol. 82, No. 921 (Jan. 1989).

Riddell et al., "Heavy Oil Mining Technical and Economic Analysis", California Regional Meeting of the Society of Petroleum Engineers, Long Beach, CA (Apr. 11-13, 1984).

International Search Report for Application No. PCT/US06/27971 dated Sep. 27, 2007 (3 pages).

Written Opinion for Application No. PCT/US06/27971 dated Sep. 27, 2007 (7 pages).

L.T. Phan, "High-Strength Concrete at High Temperature—An Overview", National Institute of Standards and Technology, Gaithersburg, MD.

T.N. Nasr, "Steam Assisted Gravity Drainage (SAGD): A New Oil Production Technology for Heavy Oil and Bitumens", Alberta Research Council, Calgary, Canada (Mar. 2003).

Author Unknown, "Kieways, The Magazine of Peter Kiewit Sons', Inc.", Jan.-Feb.-Mar. 2006, pp. 1-34.

Huang, et al., "Wet Electric Heating for Starting Up SAGD/VAPEX", Alberta Research Council, Presented at the Petroleum Society's 5th Canadian International Petroleum Conference, Jun. 2004, pp. 1-12, Paper 2004-130, Petroleum Society: Canadian Institute of Mining, Metallurgy and Petroleum.

Author Uknown, "Lateral Extension for Toronto's Metro", Tunnels & Tunnelling International, Mar. 1998, pp. 46-49.

Hardy, "Feasibility Study for Underground Mining of Oil Sand", Department of Energy, Mines and Resources, Canada, Sep. 1977, pp. 1-314.

Harris, et al., "Feasibility of Underground Mining of Oil Sand", Alberta Oil Sands Information Center, 1978, pp. 1-33.

Kindwall, et al., "Successful Use of Oxygen Decompression in Compressed Air Caisson Work", undated, pp. 1-9.

Becker, "Chapter 48: Recent Application of Slurry- and EPB-Technique in Europe", 1999 RETC Proceedings, pp. 857-864.

Palmer, et al., "Performance of a 7.6-m Diameter Full-Face Tunnel-Boring Machine Designed for a Canadian Coal Mine", date unknown, pp. 203-208.

Wallis, "Canadian Coal Given the TBM Treatment at Cape Breton", Tunnels & Tunnelling, May 1985, pp. 1-4.

Marsh et al., "Chapter 11: Design, Excavation, Support of a Large Diameter Coal Mine Access Decline Using a Tunnel Boring Machine", 1985 RETC Proceedings, vol. 1, pp. 155-176.

Peer, "Giant Rock TMB to Drive Access Tunnels Under Ocean", Heavy Construction News, Sep. 19, 1983, pp. 1-2.

Hunter, et al. "Design, Development, and Verfication of a Lovat 7.6-metre Full-Face Tunnel-Boring Machine", CIM Coal Developments, undated, pp. 1-8.

Stokes, et al., "Cutting Head Ventilation for a Full Face Tunnel Boring Machine", Cape Breton Coal Research Laboratory, CANMET, Sydney, Canada, date unknown, pp. 305-311.

Author Unknown, "Versatile Lovat Picked for Jubilee Line", Tunnels & Tunnelling, Sep. 1994, 1 page.

Humpheys, "Jubilee Line Meets the Challenge", date unknown, pp. 1-2.

Walker, "One Year Down the Jubilee Line", World Tunnelling, Feb. 1995, pp. 1-4.

Wallis, "London's JLE Experience With Closed-Face Soft-Ground Pressurised TBMs", Tunnel, Feb. 1998, pp. 1-4.

Peer, "Rock 'n' Roll Goes Underground", Heavy Construction News, Oct. 1997, pp. 12-13.

Skelhorn et al., "North American Focus: Partnering in Toronto", World Tunnelling and Subsurface Excavation, Dec. 1998, pp. 1-4.

Garrod, et al., "Earth Pressure Balance TBM Performance—A Case Study", undated, pp. 41-50.

Author Unknown, "A New TBM Saves Critical Deadline at Cleuson-Dixence Switzerland", Tunnels & Tunnelling, date unknown, pp. 1-4.

Stephenson et al., "Mining Aspects of Hard to Access Oil Sands Deposits", Norwest Corporation, Mar. 2, 2006, pp. 1-57.

Deutsch et al., "Guide to SAGD (Steam Assisted Gravity Drainage) Reservoir Characterization Using Geostatistics", Centre for Computational Geostatistics (CCG) Guidebook Series vol. 3, 2005 (27 pages).

Author Unknown, "Technical Overview: Nigeria's Bitumen Belt and Developmental Potential", Ministry of Solid Minerals Development, Mar. 6, 2006, Available at http://64.233.167.104/search?q_cache:m12yiQ5o16EJ:msmd.gov.ng/privatisation/docs/Bitumen%2520Overview.pdf+SAGD+..., printed Jan. 10, 2007, pp. 1-48.

Author Unknown, Lovat Inc. Company Brochure, date unknown, pp. 1-22.

Author Unknown, "Sunburst Excavation", IN FOCUS, Nov. 1993, pp. 18-19, 22-23.

Hignett et al.; "Tunnelling Trials in Chalk: Rock Cutting Experiments"; TRRL Laboratory Report 796; 1977.

Wallis, "Canadian coal given the TBM treatment at Cape Breton", Reprinted from Tunnels & Tunnelling, May 1985, pp. 1-4.

Ozdemir, et al., "Development of a Water Jet Assisted Drag Bit cutting Head for Coal Measure Rock" Chapter 41, RETC Proceedings, vol. 2, 1983, pp. 701-718.

Wang, et al.; "High Pressure Water Jet Assisted Tunnelling" Chapter 34, 1976 RETC Proceedings, pp. 649-676.

McCormick, et al., "Analysis of TBM Performance at the Record Setting River Mountains Tunnel #2", Chapter 8, 1997 RETC Proceedings, pp. 135-149.

Maciejewski, "Hydrotransport—An Enabling Technology for Future Oil Sands Development" Syncrude Canada Ltd., pp. 67-79.

Paine, et al., "Understanding hydrotransport: The key to Syncrude's success", CIM Bulletin, vol. 92, 1999, pp. 105-108.

Mikula et al., "Oil Sands Conditioning, Bitumen Release Mechanisms, and New Process Development", Alberta Oil Sands Information Services, 1999, pp. 1-8.

Mikula et al., "Commercial Implementation of a Dry Landscape Oil Sands Tailings Reclamation Option: Consolidated Tailings", Alberta Oil Sands Information Services; No. 1998.096, date unknown, pp. 907-921.

Friesen et al., "Monitoring of Oil Sand Slurries by On-line NIR Spectroscopy", Petroleum Society of CIM & Aostra, paper No. 94.10, date unknown, pp. 1-9.

Liu, et al.; "Volume reduction of oil sands fine tails utilizing nonsegregating tailings", Tailings and Mine Waste '96, pp. 73-81.

Matthews, et al., "Development of composite tailings technology at Syncrude Canada", Syncrude EDM Research, 2000, pp. 455-463.

Yoshidawa, et al., "A Study of Shield Tunnelling Machine (Part 1)—Soil Condition for Pressurized Slurry Shield to be Adapted-", Translation of Hitachi Zosen Technical Review, vol. 42, No. 1-4, 1981, pp. 1-41.

Author Unknown, "Mitsubishi Shield Machine", Mitsubishi Heavy Industries, Ltd., date unknown, pp. 1-38.

Czarnecki, Press Release; NSERC Industrial Research Chair in Oil Sands Syncrude Canada, Ltd, date unknown, pp. 1-3.

Canadian Heavy Oil Associate (CHOA) Annual Conference, Dec. 6, 2000, presentation by Oil Sands Underground Mining, Inc.

Stack, "Handbook of Mining and Tunneling Machinery", 1982, pp. 283 and 311.

Young, et al., "Full-scale Testing of the PCF Rock Excavation Method", VII Australian Tunelling Conference, Aug. 1993 pp. 259-264.

Babendererde, et al., "Extruded Concrete Lining—The Future Lining Technology for Industrialized Tunnelling," 2001 RETC Proceedings, Chapter 55, pp. 679-685.

Becker, "The Choice Between EPB- and Slurry Shields: Selection Criteria by Practical Examples," 1995 RETC Proceedings, Chapter 31, pp. 479-492.

Becker, "The Fourth Tube of the Elbe-Tunnel—Built by the World's Largest Soft Ground Tunnelling Machine", 2001 RETC Proceedings, Chapter 17, pp. 182-186.

Bergling, et al., "Main Bearings for Advanced TBMS," 1995 RETC Proceedings, Chapter 32, pp. 493-508.

Corti, et al., "Athabasca Mineable Oil Sands: The RTR/Gulf Extraction Process Theoretical Model of Bitumen Detachment," The 4.sup.th UNITAR/UNDP International Conference on Heavy Crude and Tar Sands Proceedings, vol. 5, Edmonton, AB, Aug. 7-12, 1988, pp. 41-44, 71.

Funasaki, et al., "World's Largest Slurry Shield Tunneling Report in Trans-Tokyo Bay Highway Construction," 1997 RETC Proceedings, Chapter 36, pp. 591-604.

Guetter, et al., "Two Tunnels in Totally Different Geological Formations Driven by the Same 7M Double-Shield TMB with an Extremely Thin-Walled Monoshell Honeycomb Segmental Lining System," 2001 RETC Proceedings, Chapter 21, pp. 241-260.

Herrenknecht, et al., "The New Generation of Soft Ground Tunnelling Machines," 1999 RETC Proceedings, Chapter 36, pp. 647-663.

Author Unknown, "Improving Profitability With New Technology," Joint Paper Between Petrel Robertson and Oil Sands Underground Mining, Inc., Edmonton, Alberta, Sep. 2001, pp. 1-44.

Jacobs, et al., "Hydrogen Sulfide Controls for Slurry Shield Tunneling in Gassy Ground Conditions—A Case History," 1999 RETC Proceedings, pp. 221-239.

Marcheselli, et al., "Construction of the 'Passante Ferroviario' Link in Milano, Lots 3P-5P-6P Excavation by Large Earth Pressure Balanced Shield with Chemical Foam Injection," 1995 RETC Proceedings, Chapter 36, pp. 549-572.

Moulton, et al., "Tunnel Boring Machine Concept for Converging Ground," 1995 RETC Proceedings, Chapter 33, pp. 509-523.

Author Unknown, "Underground Mining of Oil Sands," Oil Sands Underground Mining, Inc., presented at National Oil Sands Task Force, Jan. 2001 Quarterly Meeting, pp. 1-38.

Author Unknown, "A New Technology for the Recovery of Oil Sands," Oil Sands Underground Mining, Inc., presented at combined Oil Sands Task Force and Black Oil Pipeline Network Meeting, Jun. 2001, pp. 1-30.

Oil Sands Underground Mining, Inc., "A Private Sector Approach to Design/Build," presented at NAT 2002, 34 pages.

Richards, et al., "Slurry Shield Tunnels on the Cairo Metro," 1997 RETC Proceedings, Chapter 44, pp. 709-733.

Rose, "Steel-Fiber-Reinforced-Shotcrete for Tunnels: An International Update," 1999 RETC Proceedings, pp. 525-536.

Sager, "Underpassing the Westerschelde by Implementing New Technologies," 1999 RETC Proceedings, pp. 927-938.

Uchiyama, "Twin TBM with Four Cutters for Subway Station (Roppongi Station in the Tokyo Metro Line 12)," 1999 RETC Proceedings, Chapter 37, pp. 665-674.

Wu, et al., "Stress Analysis and Design of Tunnel Linings," Chapter 26, pp. 431-455.

Borm, "Integrated Seismic Imaging System for Geological Prediction Ahead in Underground Construction," 2001 RETC Proceedings, Chapter 22, pp. 263-271.

Dowden, et al., "Coping with Boulders in Soft Ground TBM Tunneling," 2001 RETC Proceedings, Chapter 78, pp. 961-977.

Doyle, et al., "Construction of Tunnels in Methane Environments," 1991 RETC Proceedings, Chapter 12, pp. 199-224.

Drake, et al., "A Promising New Concept for Underground Mining of Oil Sands," technical papers presented to Canadian Institute of Mining (CIM), Ft. McMurray, Jun. 13-15, 2001, pp. 1-16.

Drake, "An Innovative Approach for the Underground Mining of Oil Sands," presented at North American Tunneling 2002, Seattle, WA May 2002 and NARMS-TAC 202, Mining and Tunneling Innovation and Opportunity Conference, Toronto, Ontario, Jul. 2002, pp. 1-8.

Higashide, et al., "Application of DOT Tunneling Method to Construction of Multi-Service Utility Tunnel Adjacent to Important Structures," 1995 RETC Proceedings, Chapter 34, pp. 527-541.

Ounanian, et al., "Development of an Extruded Tunnel Lining System". Chapter 81, 1981 RETC Proceedings, vol. 2, pp. 1333-1351.

Stokes, et al.; "Cutting head ventilation of a full face tunnel boring machine"; Cape Breton Coal Research Laboratory, CANMET, Sydney, Canada, date unknown, pp. 305-311.

Schenk, "Recent Developments in High-Pressure Water-Jet Assisted Cutting of Rock and Coal", The Pennsylvania State University, RETC Proceedings, vol. 2, Chapter 39, 1983, pp. 663-684.

Zink, et al., "Water Jet Uses in Sandstone Excavation", RETC Proceedings, vol. 2, Chapter 40, 1983, pp. 685-700.

Souder, et al. "Water Jet Coal Cutting: The Resurgence of an Old Technology", RETC Proceedings, vol. 2, Chapter 42, 1983, pp. 719-739.

Cardwell et al., "Gravity Drainage Theory," Petroleum Transactions, AIME, vol. 179, 1949, pp. 199-211.

Dykstra, H., "The Prediction of Oil Recovery by Gravity Drainage," Journal of Petroleum Technology, May 1978, pp. 818-830.

Kewen et al., "Prediction of Production by Gravity Drainage," Stanford University, SPE 84184, Oct. 2003, p. 1-8.

Terwilliger et al. "An Experimental and Theoretical Investigation of Gravity Drainage Performance," Petroleum Transactions, AIME, vol. 146, 1951, pp. 285-296.

Official Action for Canadian Patent Application No. 2,614,569, dated Apr. 16, 2010.

Official Action for Canadian Patent Application No. 2,614,569, dated Dec. 2, 2010.

Sahni et al., "Electromagnetic Heating Methods for Heavy Oil Reservoirs," Submitted to 2000 Society of Petroleum Engineers, SPE/AAPG Western Regional Meeting, May 1, 2000, Long Beach, CA, pp. 1-12.

Singh et al., "Cost Analysis of Advanced Technologies for the Production of Heavy Oil and Bitumen in Western Canada," Alberta Research Council, 17th World Energy Council, Edmonton, Alberta, Canada, Sep. 1998, 11 pages.

International Preliminary Report on Patentability for International (PCT) Patent Application No. PCT/US06/027971, issued Mar. 17, 2009.

* cited by examiner

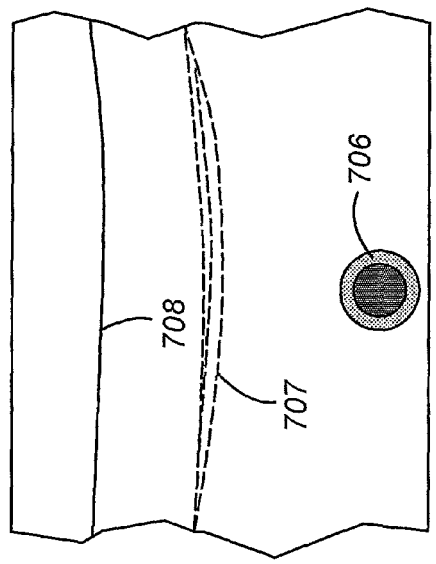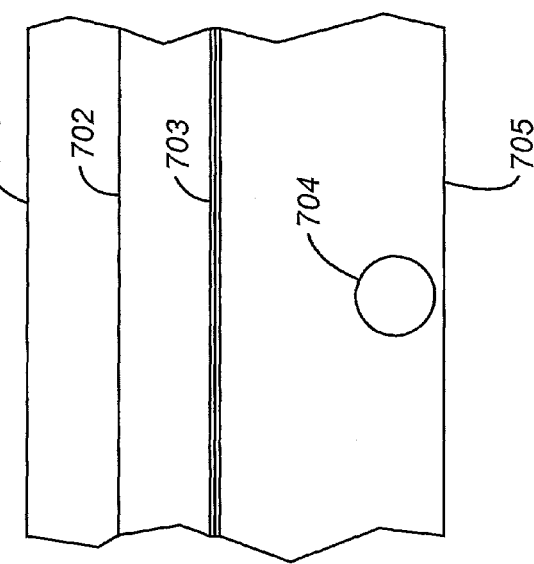

METHOD OF INCREASING RESERVOIR PERMEABILITY

CROSS REFERENCE TO RELATED APPLICATION

The present application claims the benefits, under 35 U.S.C. §119(e), of U.S. Provisional Application Ser. No. 60/700,387 filed Jul. 18, 2005, entitled "Method of Increasing Reservoir Permeability" to Kobler and Watson; and U.S. Provisional Application Ser. No. 60/753,694, filed Dec. 23, 2005, entitled "Method of Recovering Bitumen" to Brock, Kobler and Watson; both of which are incorporated herein by these references.

FIELD

The present invention relates generally to a method and system for increasing hydrocarbon reservoir permeability by creating free volume in the reservoir so that the surrounding reservoir material subsides into the free volume under the action of formation pressure and/or gravity causing fractures and other pathways to develop in the reservoir material.

BACKGROUND

Oil is a nonrenewable natural resource having great importance to the industrialized world. The increased demand for and decreasing supplies of conventional oil has led to the development of alternative sources of crude oil such as oil sands containing bitumen or heavy oil and to a search for new techniques for more complete recovery of oil stranded in conventional oil deposits.

The Athabasca oil sands are a prime example of a huge alternative source of crude and is currently thought to have proven reserves of over 175 billion barrels recoverable by both surface mining and in-situ thermal recovery methods. There are also equally large untapped reserves of stranded light and heavy oil deposits from known reservoirs throughout North America which cannot be recovered by surface drilling methods. These two sources of oil, bitumen and stranded oil, are more than enough to eliminate dependence on other sources of oil and, in addition, require no substantial exploration.

U.S. patent application Ser. No. 11/441,929 filed May 27, 2006, entitled "Method for Underground Recovery of Hydrocarbons" discloses a method for installing, operating and servicing wells in a hydrocarbon deposit from a lined shaft and/or tunnel system that is installed above, into or under a hydrocarbon deposit. The entire process of installing the shafts and tunnels as well as drilling and operating the wells is carried out while maintaining isolation between the work space and the ground formation. This invention often involves tunnels being driven into a hydrocarbon deposit for the purpose of installing horizontal and inclined wells into the hydrocarbon deposit. These wells may be used to collect hydrocarbons and inject fluids such as gas, water, steam or diluents into the formation to apply secondary and tertiary recovery techniques. The effectiveness of collector and injector wells is directly related to the local ground permeability around the wells and to the permeability of the hydrocarbons throughout the reservoir.

Reservoir Permeability

Stranded light and heavy oil reservoirs in sandstones or carbonates may have permeabilities parallel to the bedding planes in the range of a few millidarcies to several hundred millidarcies. Permeabilities vertical to the bedding planes are in the same range but in addition there may be impermeable layers, taken here as less than about 5 millidarcies, parallel to the bedding planes that prevent continuous vertical flow of fluids.

The permeability of oil sands is typically in the range of a few hundred darcies to several darcies. However the permeability vertical to the bedding planes of an oil sands reservoir may be disrupted by impermeable beds of mudstone and shale. The permeability of these layers is typically in the range of a few millidarcies or less. These layers may be a few centimeters to several centimeters thick and can form an impermeable barrier. Alternately, these layers may not be continuous but may be comprised of many thin layers in a sequence that can form a labyrinth that has the same blocking effect as a continuous impermeable membrane.

Tunneling and Drilling

In recent decades, there has been a substantial increase in the number of soft-ground civil tunneling projects utilizing the proven technologies of tunneling and tunnel boring machines ("TBMs"). This increase is largely due to the technological development of large slurry and Earth Pressure Balance ("EPB") tunnel boring machines. This new generation of soft ground tunneling machines can now overcome ground conditions that until now were too costly and impractical to undertake.

In particular, the civil soft-ground tunneling industry has developed methods to control ground subsidence to a few inches or less as a requirement for tunneling under buildings, utilities and other sensitive structures. This control is achieved through careful tunneling practice coupled with a variety of measurements and often supporting numerical computational analyses.

In an EPB machine, the excavated material or muck is ingested into a chamber which is maintained at about local formation pressure (hence the name earth pressure balance). The excavated material is mixed with a plasticizer that gives the muck cohesion. A screw auger then transfers the plasticized muck to a conveyor system where the muck in the auger forms an effective seal between the inside of the machine and the formation outside. A slurry TBM can also be operated to maintain the excavated material or muck at about local formation pressure in a slightly different way during excavation. The slurry TBM cutting head excavates by forming the ground just ahead of it into a dense slurry. The slurried muck is ingested into a pressurized chamber and then formed into a transportable slurry by adding additional water. The slurry may be transported out of the tunnel at approximately formation pressure in a closed slurry system. Thus, like the EPB machine, the excavation and muck removal can be carried out by a slurry TBM at or near formation pressure while the working areas in the TBM and tunnel can remain at ambient pressure and isolated from the slurried muck.

These machines are typically used to install lined tunnels and are operated to excavate the minimum size opening to efficiently install a liner. There is typically a small gap between the outside of the tunnel liner and the excavated opening. This is typically backfilled with a grout to eliminate any void space so that, among other things, the ground will not subside into the gap.

Developments in soft-ground tunneling led to the practice of micro-tunneling which is a process that uses a remotely controlled micro-tunnel boring machine typically combined with a pipe-jacking technique to install underground pipelines and small tunnels. Micro-tunneling has been used to install pipe from twelve inches to twelve feet in diameter and therefore, the definition for micro-tunneling does not necessarily include size. The definition has evolved to describe a tunneling process where the workforce does not routinely work in the tunnel.

Drilling technologies for soft and hard rock are also well known. Conventional rotary drilling and water jet drilling, for example, have been utilized in oil and gas well drilling, geothermal drilling, waste and groundwater control as well as for hard rock drilling. Drill holes are typically drilled to a diameter just large enough to allow a casing to be installed. Certain drilling techniques, such as water jet drills can be operated to over-excavate the diameter of the drill hole to a size much larger than the drill bit. Most drilling techniques, including rotary and auger, can excavate a hole somewhat larger than the casing.

In open-hole drilling with liquid drilling muds, the well-bore fluid pressure is typically maintained higher than the local natural formation pressure. This is known as overbalanced drilling and there are often problems associated with overbalanced drilling such as lost circulation, differential sticking, low drilling rates, formation damage such as development of a "skin". Many drillers are now using underbalanced open-hole drilling where the wellbore fluid pressure is maintained lower than the local natural formation pressure, thus permitting the formation fluids to tend to flow towards the wellbore while drilling. Underbalanced drilling is considered, in many drilling situations, to reduce the problems associated with overbalanced drilling.

Although most tunneling and drilling methods are designed to form an excavated opening of the minimum diameter for installing a tunnel liner or a well casing, the technologies developed to control excavated hole diameter and ground motion can be used to create excavated openings of much greater diameter.

Means of Altering Reservoir Permeability

One of the common methods of increasing horizontal permeability is by applying well-fracturing or "fracing" methods, typically to induce fractures parallel to the bedding planes to connect pre-existing fractures and flow pathways in the reservoir rock with larger, man-made fractures. A man-made fracture starts at the well bore and extends out into the reservoir rock for as much as several hundred feet or more. In hydraulic well-fracturing practice, large volumes of fluids (typically water or water-based liquids, including polymers, in amounts from a few hundred to over 100,000 gallons) are pumped down a well bore casing. The fluid is injected into the hydrocarbon formation through perforations in the casing walls along the producing zone of the well or from a packer system inserted into open, uncased formation. The fluid pumping continues until the hydraulic pressure of the fluid in the reservoir exceeds the bulk tensile strength of the host rock, which opens up and drives fractures into the reservoir with the wings of the fracture extending away from the wellbore in opposing directions according to the orientation of natural stresses within the formation. A proppant material, such as natural or manufactured sand, is usually contained in the injected fluid to keep the fractures open after the fluid injection pressure has diminished. These induced fractures create secondary permeability by opening up pathways to connect pre-existing fractures and flow pathways in the reservoir rock and so must compact other portions of the reservoir material to conserve mass (in some cases of shallow fracturing, the well-fracturing process can produce heave of the formation at the surface). These fractures also increase the amount of area in the reservoir to which product fluids can flow, comparable to a system of multiple additional wellbores within the formation. Other means of well-fracturing include pressurizing the well-bore and any pre-existing fractures in the reservoir using propellant or explosive charges. These approaches are more dynamic and are thought to be more effective for controlling the direction of the induced fractures.

These means of increasing permeability in general do not do so by removing reservoir matrix material but act by compressing portions of the reservoir material so that the other portions may expand.

In the case of oil sands where the hydrocarbons are immobile, various thermal or chemical means may be used to melt or mobilize the bitumen or heavy oil thus enabling the natural permeability of the reservoir to be realized. Thermal treatments or water pressure treatments may also increase reservoir permeability by causing expansion of the reservoir matrix.

There thus remains a need for new methods to increase reservoir permeability that can be used in lieu of or in addition to the various reservoir fracturing methods.

SUMMARY

These and other needs are addressed by the present invention.

In one aspect of the present invention, a method and system is provided that increases hydrocarbon reservoir permeability by creating free volume in the reservoir. The surrounding reservoir material slumps, caves or subsides into the free volume under the action of formation pressure and/or gravity causing voids, fractures and other pathways to develop in the reservoir material.

In one embodiment of this aspect, a method is provided that includes the steps:

(a) providing a first underground excavation in proximity to a hydrocarbon-containing deposit; and (b) forming, from the first underground excavation, a second underground excavation, the second underground excavation being designed to at least partially cave in to increase a permeability of the hydrocarbon-containing deposit and/or an adjacent hydrocarbon-barren deposit.

The first underground excavation can be any passageway, such as a drill hole (vertical or inclined), shaft, raise, stope, tunnel, drift, decline, or incline.

The second excavation (and in some cases the first excavation) is preferably "over-excavated" so as to remove more material than commonly required (e.g., to install the liner or casing). This practice will cause the ground around the excavation, but especially the ground above the excavation, to subside. This subsidence will cause expansion of the reservoir material and thereby tend to increase its permeability. For example after the second underground excavation at least partially caves in, a zone of disturbance substantially surrounds the second underground excavation. A diameter of the zone of disturbance is generally at least about 200% of the diameter of the second excavation.

In one configuration, the second underground excavation includes an underground workspace defined by a fixed liner. The liner is separated from a surface of the second underground excavation by a free volume to receive a caved-in portion of the deposit. In this configuration, the second underground excavation is typically formed by a tunnel boring machine. As will be appreciated, the tunnel boring machine includes a rotating cutter head having a first diameter and shield having a second diameter. The liner is assembled under the shield and has a third diameter. The second diameter ranges from about 25 to about 100 millimeters smaller than the first diameter, while the third diameter ranges from about 50 to about 200 millimeters smaller than the second diameter. This covers the range for a 1 meter micro-tunneling machine to a 15 meter TBM.

Stated another way, the ratio of the second diameter to the first diameter is in the range of from about 96% to about 99.7%; the ratio of the third diameter to the second diameter is in the range of from about 91.7% to about 99.3%; and the ratio of third diameter to the first diameter is in the range of from about 88% to about 99% of the first diameter.

Like the second underground excavation, the first underground excavation may be formed by the tunnel boring machine and have the liner separated from a surface of the first underground excavation by the free volume.

In over-excavating the first and/or second excavations, the ingestion rate of excavated material through the rotating cutter head of the tunnel boring machine is preferably greater than the ingestion rate of excavated material through the rotating cutter head required to form each of the first and second underground excavations.

In another embodiment, the second excavation is a cased drill hole. The casing is separated from a surface of the second underground excavation by the free volume to receive a caved-in portion of the hydrocarbon-containing and/or hydrocarbon-barren deposit. The second excavation may be formed by any technique, such as a rotary or auger type drill, use of a large drill bit relative to the size of the casing to be installed, micro-tunnel drilling techniques, and a water jet drill configured to direct jets of water towards a direction of advance and at an angle to the direction of advance.

In another embodiment, the second excavation is a drill hole, and the drill hole is without a casing. The drill hole may be formed by over- and/or underbalanced drilling techniques. In one application, the drill hole is formed by overbalanced drilling followed by reduction of a pressure of the fluid in the hole to an underbalanced condition to induce cave-in of the hole.

In another configuration, further underground excavations are formed from the first and/or second excavation. One or more of the excavations is cased, and the remainder are uncased to cave-in. The cased excavation is substantially surrounded by the uncased excavations. In this manner, a permeability of the hydrocarbon-containing and/or hydrocarbon-barren deposit in the vicinity of the cased excavation is increased by the caving in of the uncased excavations.

In yet another aspect of the present invention, a number of drill holes are formed from an underground excavation so that they penetrate a hydrocarbon-containing deposit. The drill holes extend upwards through the hydrocarbon deposit, which includes two or more layers having a first permeability. The drill holes also pierce one or more further layers having a second permeability. The second permeability is at least less than half of the first permeability. At least a portion of the hydrocarbons in the deposit drain downward along the drill holes through the one or more further layers having the second permeability.

The present invention can provide advantages depending on the particular configuration. For example, the invention can permit effective recovery of stranded hydrocarbons that are currently not recoverable using conventional techniques. The invention can increase permeability by partially or completely caving in excavations in the hydrocarbon deposit. Caving in of the excavation can cause subsidence of the formation. This subsidence will cause expansion of the reservoir material and thereby increase its permeability. Alternately, if the ground does not subside, the larger drilled well bore will allow faster collection or injection of fluids by virtue of its large diameter and resulting higher hydraulic capacity.

These and other advantages will be apparent from the disclosure of the invention(s) contained herein.

The following definitions are used herein:

A hydrocarbon is an organic compound that includes primarily, if not exclusively, of the elements hydrogen and carbon. Hydrocarbons generally fall into two classes, namely aliphatic, or straight chain, hydrocarbons, cyclic, or closed ring, hydrocarbons, and cyclic terpenes. Examples of hydrocarbon-containing materials include any form of natural gas, oil, coal, and bitumen that can be used as a fuel or upgraded into a fuel. Hydrocarbons are principally derived from petroleum, coal, tar, and plant sources.

A hydrocarbon deposit is a geological strata containing hydrocarbons at least a portion of which is typically economically recoverable. As used herein, a hydrocarbon deposit may be formed by natural processes or by man-made processes. An example of the latter is a spillage of hydrocarbons that saturates the ground around it.

Hydrocarbon production or extraction refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the well bore to promote increased flow, well servicing, well logging, and other well and wellbore treatments. Hydrocarbon production may also refer to the extraction, mobilization or degradation of contaminant hydrocarbons by means such as vapor extraction (VE), air sparging (AS), hot air injection, dual phase extraction (DPE) or the introduction of biological materials for the purpose of breaking down hydrocarbons in a rock or soil formation.

A liner as defined for the present invention is any artificial layer, membrane, or other type of structure installed inside or applied to the inside of an excavation to provide at least one of ground support, isolation from ground fluids (any liquid or gas in the ground), and thermal protection. As used in the present invention, a liner is typically installed to line a shaft or a tunnel, either having a circular or elliptical cross-section. Liners are commonly formed by pre-cast concrete segments and less commonly by pouring or extruding concrete into a form in which the concrete can solidify and attain the desired mechanical strength.

A liner tool is generally any feature in a tunnel or shaft liner that self-performs or facilitates the performance of work. Examples of such tools include access ports, injection ports, collection ports, attachment points (such as attachment flanges and attachment rings), and the like.

A mobilized hydrocarbon is a hydrocarbon that has been made flowable by some means. For example, some heavy oils and bitumen may be mobilized by heating them or mixing them with a diluent to reduce their viscosities and allow them to flow under the prevailing drive pressure. Most liquid hydrocarbons may be mobilized for commercial production by increasing the drive pressure on them, for example by water or gas floods, so that they can overcome interfacial and/or surface tensions and begin to flow. Contaminant hydrocarbons can be mobilized by previously mentioned techniques (SVE, AS, DPE and other techniques)

A seal is a device or substance used in a joint between two apparatuses where the device or substance makes the joint substantially impervious to or otherwise substantially inhibits, over a selected time period, the passage through the joint of a target material, e.g., a solid, liquid and/or gas. As used herein, a seal may reduce the in-flow of a liquid or gas over a selected period of time to an amount that can be readily controlled or is otherwise deemed acceptable. For example, a seal between a TBM shield and a tunnel liner that is being installed, may be sealed by brushes that will not allow large water in-flows but may allow water seepage which can be controlled by pumps. As another example, a seal between sections of a tunnel may be sealed so as to (1) not allow large water in-flows but may allow water seepage which can be controlled by pumps and (2) not allow large gas in-flows but may allow small gas leakages which can be controlled by a ventilation system.

A shaft is a long approximately vertical underground opening commonly having a circular cross-section that is large enough for personnel and/or large equipment. A shaft typically connects one underground level with another underground level or the ground surface.

A tunnel is a long approximately horizontal underground opening having a circular, elliptical or horseshoe-shaped cross-section that is large enough for personnel and/or vehicles. A tunnel typically connects one underground location with another.

An underground workspace as used in the present invention is any excavated opening that is effectively sealed from the formation pressure and/or fluids and has a connection to at least one entry point to the ground surface.

A well is a long underground opening commonly having a circular cross-section that is typically not large enough for personnel and/or vehicles and is commonly used to collect and transport liquids, gases or slurries from a ground formation to an accessible location and to inject liquids, gases or slurries into a ground formation from an accessible location.

Well drilling is the activity of collaring and drilling a well to a desired length or depth.

A well casing is a liner installed into an open well bore generally to prevent the well bore from collapsing and for preventing undesired formation fluids from entering the well. Where the casing is inside the hydrocarbon containing zones, it is typically perforated by various known means to allow the hydrocarbon to enter the well and be recovered or to allow other liquids or gas to be injected into the formation for production enhancement or waste disposal.

Well completion refers to any activity or operation that is used to place the drilled well in condition for production. Well completion, for example, includes the activities of open-hole well logging, casing, cementing the casing, cased hole logging, perforating the casing, measuring shut-in pressures and production rates, gas or hydraulic fracturing and other well and well bore treatments and any other commonly applied techniques to prepare a well for production.

Wellhead control assembly as used in the present invention joins the manned sections of the underground workspace with and isolates the manned sections of the workspace from the well installed in the formation. The wellhead control assembly can perform functions including: allowing well drilling, and well completion operations to be carried out under formation pressure; controlling the flow of fluids into or out of the well, including shutting off the flow; effecting a rapid shutdown of fluid flows commonly known as blow out prevention; and controlling hydrocarbon production operations.

Well-fracturing, also known as well-fracing a method of inducing fractures around a well-bore by injecting large volumes of water at certain locations along the well-bore. The use of propellant and explosive charges has also be used to create pressure and drive fractures into the reservoir.

It is to be understood that a reference to oil herein is intended to include low API hydrocarbons such as bitumen (API less than ~10°) and heavy crude oils (API from ~10° to ~20°) as well as higher API hydrocarbons such as medium crude oils (API from ~20° to ~35°) and light crude oils (API higher than ~35°) as well as contaminant hydrocarbons of any API gravity.

It is to be understood that a reference to impermeable barrier herein is intended to mean impermeable barrier to the production of hydrocarbons.

Primary production or recovery is the first stage of hydrocarbon production, in which natural reservoir energy, such as gasdrive, waterdrive or gravity drainage, displaces hydrocarbons from the reservoir, into the wellbore and up to surface. Production using an artificial lift system, such as a rod pump, an electrical submersible pump or a gas-lift installation is considered primary recovery.

Secondary production or recovery methods frequently involve an artificial-lift system and/or reservoir injection for pressure maintenance. The purpose of secondary recovery is to maintain reservoir pressure and to displace hydrocarbons toward the wellbore.

Tertiary production or recovery is the third stage of hydrocarbon production during which techniques that alter the original properties of the oil are used. Enhanced oil recovery can begin after a secondary recovery process or at any time during the productive life of an oil reservoir. Its purpose is not only to restore formation pressure, but also to improve oil displacement or fluid flow in the reservoir. The three major types of enhanced oil recovery operations are chemical flooding, miscible displacement and thermal recovery.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIGS. 7a and 7b are schematic end views of the present invention before and after inducing ground motion.

DETAILED DESCRIPTION

Recovery of Hydrocarbons from and Underground Workspace

Figure 1:
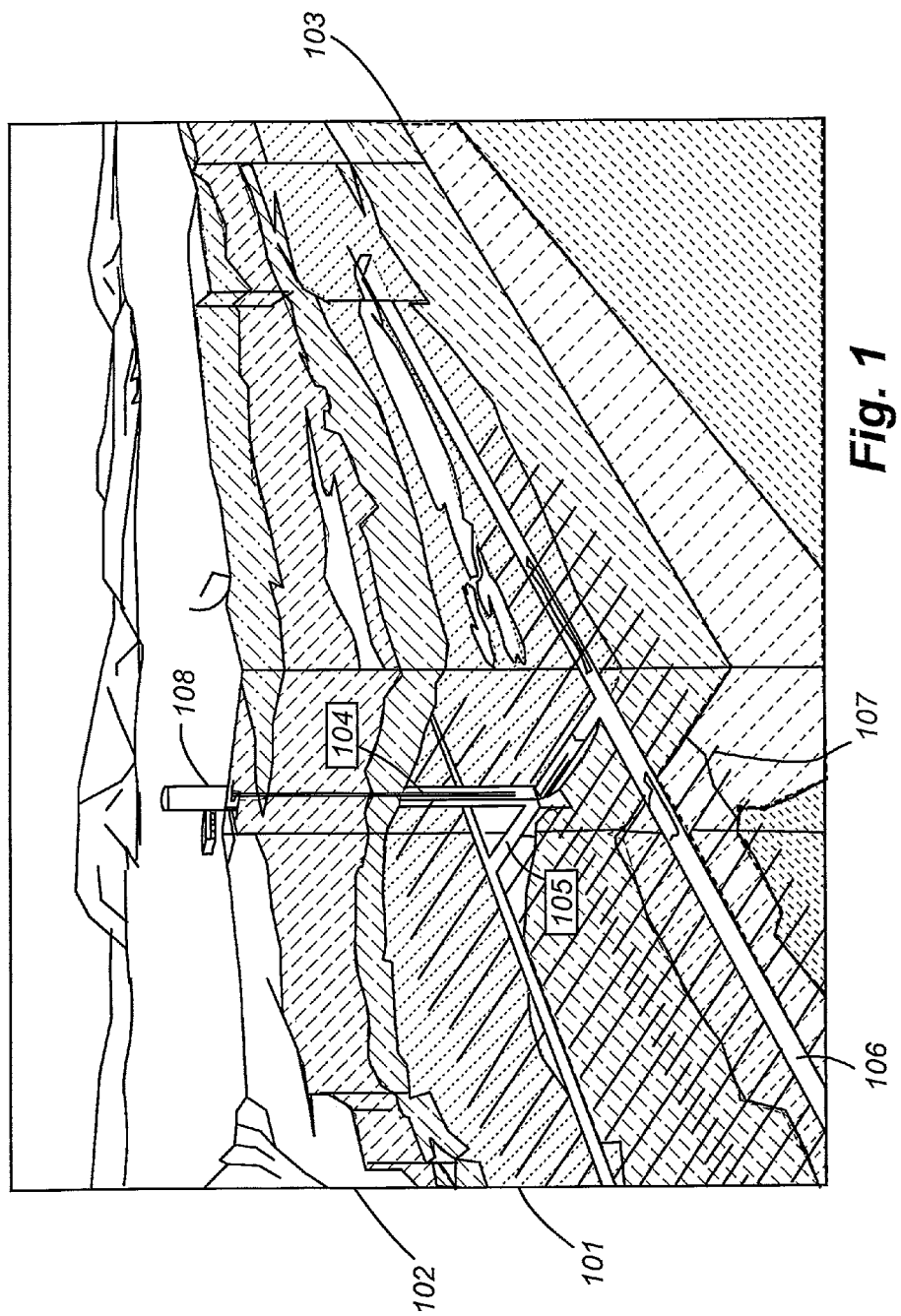
FIG. 1 is a artistic rendering of a typical underground oil mine installed in the hydrocarbon formation.

FIG. 1 is a schematic of a possible underground oil mine as described in U.S. patent application Ser. No. 11/441,929 filed May 27, 2006, entitled "Method for Underground Recovery of Hydrocarbons". The mine consists of an entry shaft 104 with surface access silo 108. The shaft 104 is connected to two lateral tunnels 105 which lead to two long tunnels 106. Tunnels 106 may be approximately parallel (as shown for example in FIG. 4) or they may be installed so as to take advantage of particular features of a hydrocarbon reservoir. The shaft 104 extends through the hydrocarbon deposit 101. Tunnels 105 and 106 are shown installed in the hydrocarbon deposit 101 near the bottom of the deposit. The shaft 104 and tunnels 105 and 106 are lined tunnels with the tunnel liners typically being formed from concrete liner segments. In the configuration shown, a large number of approximately horizontal wells 107 are shown drilled into the hydrocarbon deposit 101. The wells 107 are shown all terminating in the hydrocarbon deposit 101. The wells 107 are typically in the range of about 200 meters to about 1,200 meters in length. The hydrocarbon deposit 103 is overlain by barren formations 102 and underlain by a basement formation 103. In alternate mine configurations, the tunnels 105 and 106 may be installed in the overlying formations 102 or in the underlying formations 103. The key aspect of this mine system is that the tunnels and shafts are lined and effectively sealed against formation pressures as well as fluid in-flows and seepages. As will be described below, the tunnels 106 and/or the wells 107 can be over-excavated to create zones of enhanced permeability around their bores so that they may better drain the hydrocarbons when drain ports and/or wellhead equipment are provided. As can be appreciated, other underground workspace configurations can be used. For example, in certain formations, when the underlying basement rock is competent, the underground workings may be installed in the formation underlying a hydrocarbon formation and wells may be drilled up into the hydrocarbon formation. In these configurations, the wells in the hydrocarbon formation can be over-excavated to create zones of enhanced permeability around their bores.

Figure 2:
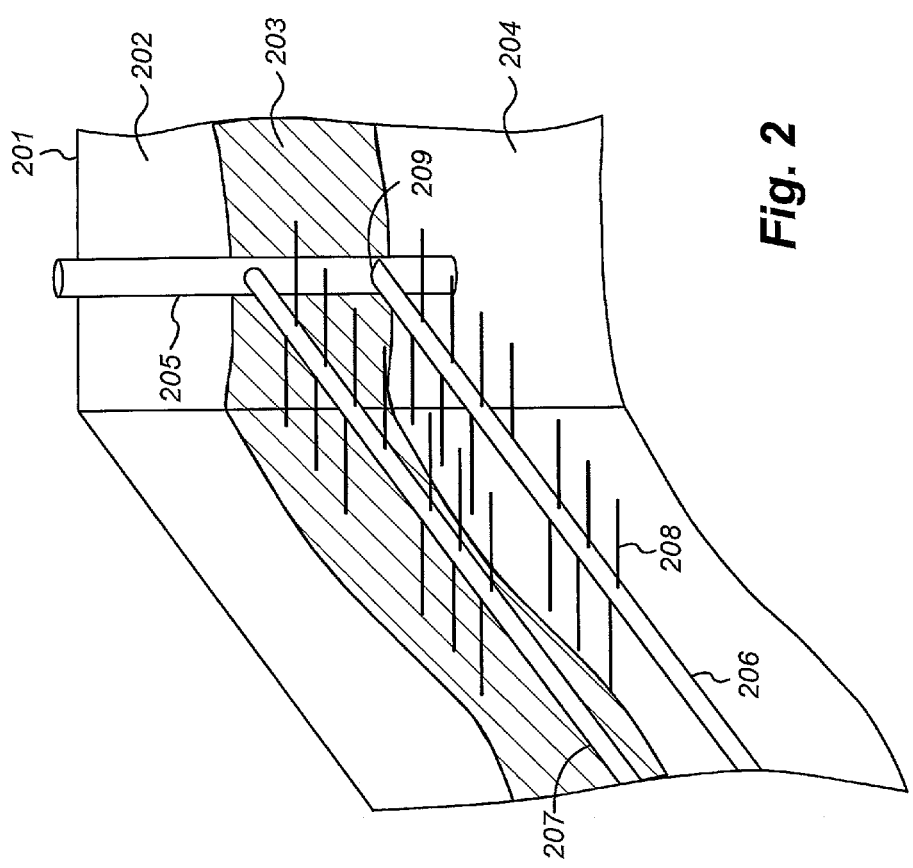
FIG. 2 is an isometric schematic view of a shaft, tunnel and well complex installed in a hydrocarbon formation.

FIG. 2 is an isometric view of a shaft, tunnel and well complex installed in a hydrocarbon formation with a different configuration than that shown in FIG. 1. This figure shows a shaft 205 connecting the surface 201 with a hydrocarbon formation 203. The hydrocarbon formation itself may be comprised of one or more zones of hydrocarbon, each separated by a thin permeable barrier. A shaft 205 penetrates the formations 202 overlaying the hydrocarbon formation 203 and terminates in a basement formation 204. The shaft 205 may be sunk below the hydrocarbon formation 203 to accommodate shaft elevator equipment or provide a sump volume for the oil produced. In this example, the shaft 205 connects the surface with two tunnels 206 and 207. The upper tunnel 207 may be used for example to install producer or injection wells into the top of the hydrocarbon formation 203. The lower tunnel 206 may be used for example to install producer or injection wells into the bottom of the hydrocarbon formation 203. In this figure, blind wells 208 are shown drilled horizontally into the hydrocarbon formation. As can be appreciated, wells can be drilled at any angle into the formation as will be described in subsequent figures. A key feature of this installation are the junctions 209 between the shaft 205 and the tunnels 206 and 207. If these junctions are in a pressurized or gassy or fluid-saturated portion of the formation, they must be sealed junctions. The junctions are not necessarily sealed during installation as dewatering, degassing or other well known techniques can be applied during installation to cope with fluid or gas inflows. A method for maintaining a seal at such junctions 209 during installation is described in U.S. patent application Ser. No. 11/441,929 filed May 27, 2006, entitled "Method for Underground Recovery of Hydrocarbons". As can be appreciated, wells can be drilled into the formation from the tunnels or shafts at any time after the tunnels and shafts are installed. Thus, it is straightforward to drill additional wells from the tunnels where the new wells are drilled between the existing wells to in-fill the well network, creating a dense network of wells in the formation. When drilled from a tunnel of the present invention located inside or adjacent to the hydrocarbon formation, the well lengths are almost entirely in the hydrocarbon formation and there is no cost to drill through the overburden as would be the case with wells drilled from the surface. This is a substantial advantage of installing wells from an underground workspace such as described in U.S. Pat. No. 4,458,945 "Oil Recovery Mining Method and Apparatus" and U.S. patent application Ser. No. 11/441,929 filed May 27, 2006, entitled "Method for Underground Recovery of Hydrocarbons".

Figure 3:
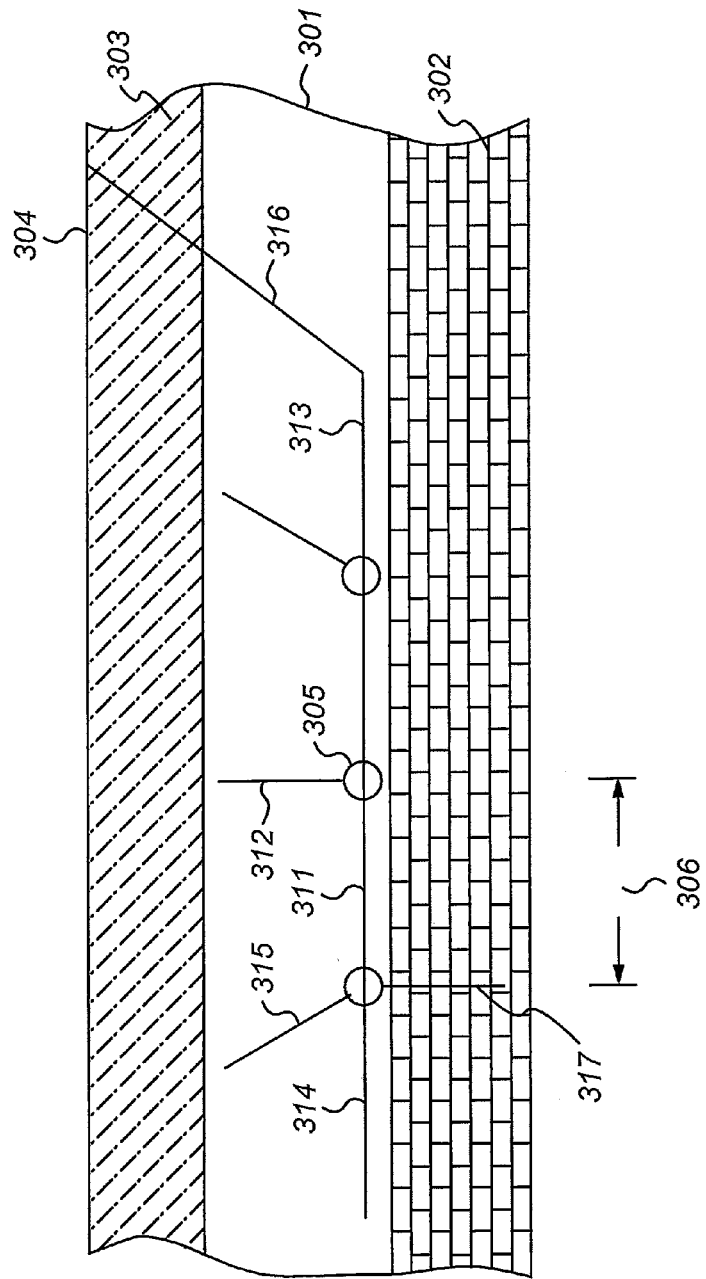
FIG. 3 is a schematic end view of multiple tunnels and wells installed near the bottom of a hydrocarbon formation.

FIG. 3 is a schematic end section view of multiple tunnels and wells installed near the bottom of a hydrocarbon formation 301 showing a surface 304, an overburden 303 and an underlying basement formation 302. It is understood that the hydrocarbon formation 301 may be comprised of multiple producing zones, each zone being separated by a thin permeability barrier. Each tunnel 305 provides an underground workspace for drilling and operating wells in the hydrocarbon formation 301. The tunnels 305 are driven roughly parallel to each other with a spacing 306. The spacing 306 between adjacent tunnels 305 is typically in the range of about 100 to about 2,000 meters. The tunnel is formed by a structural liner (as illustrated, for example, in FIG. 8) which is preferably constructed of approximately cylindrical sections that are gasketed and bolted together to form a workspace effectively sealed from the surrounding formation. The diameter of the tunnels 305 is preferably in the range of about 3 meters to 12 meters. Several types of wells may be drilled to connect with the tunnels 305. Well 311 is drilled through the hydrocarbon formation 301 from tunnel to tunnel, the tunnels 301 being approximately in the range of about 200 meters to about 1,000 meters apart in this case. Well 314 is drilled out into the hydrocarbon formation 301 and terminates as a blind well in the hydrocarbon formation 310. A blind well 314 is typically in the length range of approximately 100 to 1,000 meters but may be longer as blind drilling techniques are improved. Inclined well 315 is drilled to various desired locations in the hydrocarbon formation 310 and may be used, for example, to inject fluids for enhanced oil recovery ("EOR"). Well 316 is drilled down from the surface to connect with a tunnel. Well 316 may have a horizontal section 313 in the hydrocarbon formation 301 as shown. The horizontal section 313 of well 316 is typically in the length range of approximately 100 to 1,000 meters but may be longer as surface drilling techniques are improved. Well 317 is drilled vertically down and terminates as blind well in the basement formation 302. Well 317 may be used, for example to sequester carbon dioxide or other gases or fluids that may be sequestered in the underlying formation. The diameters of the wells, the lengths of the wells and the spacing of the wells around the tunnels and along the length of the tunnels are controlled by the instructions of the reservoir engineer. The well lengths are limited by the drilling technology employed but are at least in the range of about 100 to 1,000 meters in length. The well diameters are in the range of about 50 mm to 1,000 millimeters, depending on the instructions of the reservoir engineer. The wells may be drilled as single wells, as well pairs such as commonly used in SAGD thermal recovery operations or as three well stacks such as used in some advanced SAGD thermal recovery operations. The methods of drilling from within the tunnels 305 may include, for example, conventional soft ground drilling methods using rotary or augur bits attached to lengths of drill pipe which are lengthened by adding additional drill pipe sections as drilling proceeds. Drilling methods may also include, for example, water jet drilling methods. Drilling methods may also include, for example, micro-tunneling techniques where a slurry excavation head is used and is advanced into the deposit by pipe-jacking methods. Forms of directional drilling may be used from within a tunnel. More conventional directional drilling methods may be used for wells or well pairs drilled from the surface to intercept a tunnel such as described in subsequent discussions. Although not shown, wells may be drilled upwards at an inclination such as well 315 and then be directionally changed to be a horizontal well at a new elevation within the formation.

Figure 4:
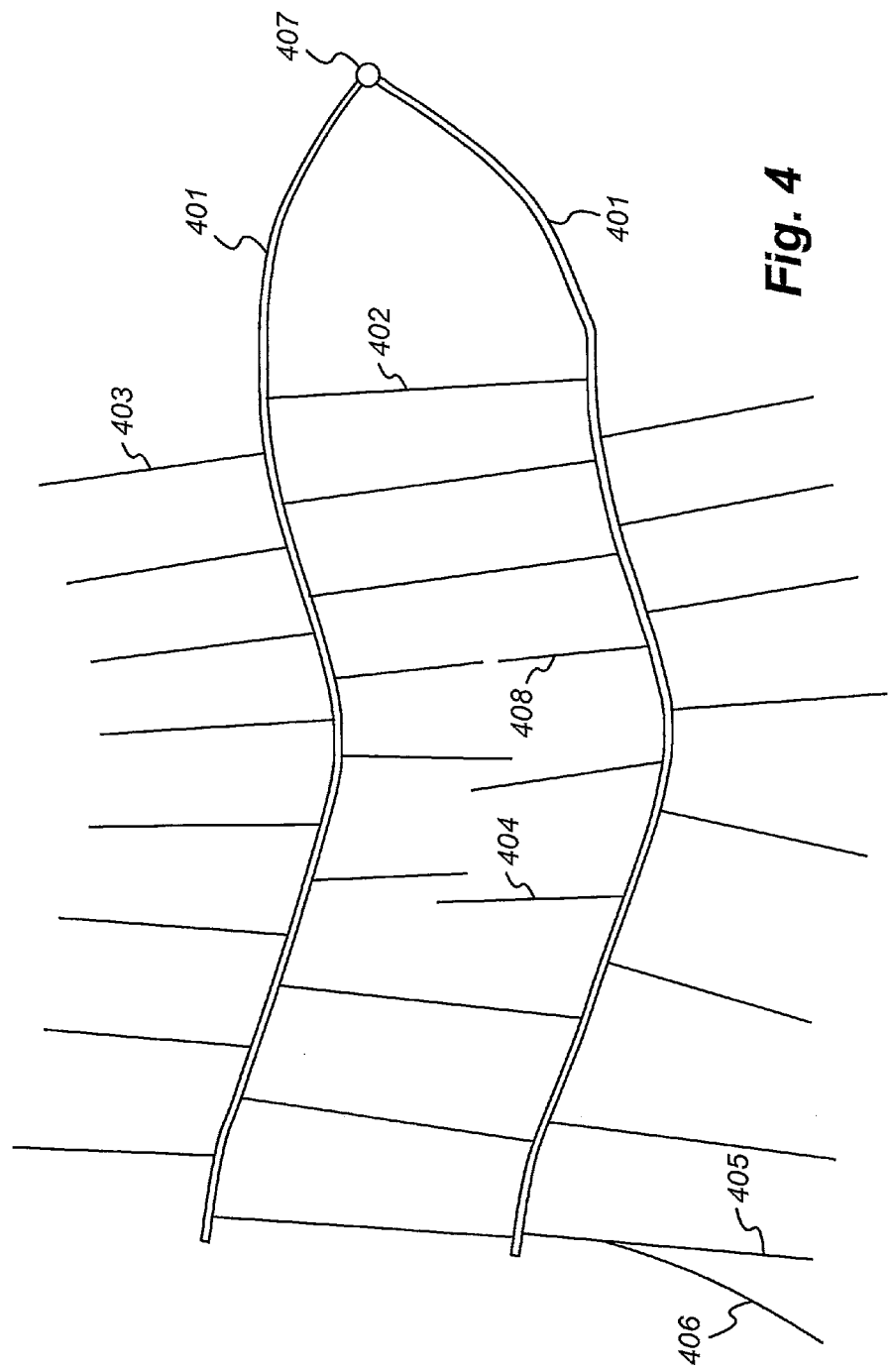
FIG. 4 is a schematic plan view of a typical configuration of wells drilled from tunnels in a hydrocarbon formation.

FIG. 4 is a schematic plan view of a typical configuration of wells drilled from tunnels in or adjacent to a hydrocarbon formation. The tunnels themselves may contain provisions for directly injecting steam and collecting fluids and therefore act as large wells themselves. One or more tunnels 401 are driven substantially horizontally into a hydrocarbon formation, approximately following the path of interest in the formation. In this embodiment, a plurality of wells 402, 403, 404, 405 and 408 are drilled outwardly from each tunnel 401 into the hydrocarbon formation. These wells are drilled from the tunnel and are designed to remain substantially within the hydrocarbon deposit. If more than one tunnel is installed, then the tunnels are spaced apart by a distance in the range of approximately 200 to 1,000 meters as indicated by well 402 which connects two tunnels 401. As shown in FIG. 4, wells 403, 404, 405 and 408 are drilled from the tunnels 401 and terminate in the hydrocarbon formation as blind wells. The lengths of the wells 403, 404, 405 and 408 are approximately half the distance between adjacent tunnels. The lengths of wells are thus in the approximate range of about 100 to about 400 meters. If all the wells are drilled as blind wells, the spacing between tunnels may be as much as about 2,000 meters and the blind wells may be up to about 1,000 meters in length. Other wells 402 may be drilled from one tunnel to the other. Other wells 405 may be drilled into the hydrocarbon formation and then offshoot wells 406 can be additionally drilled. As can be appreciated any number of offshoot wells 406 can be drilled from the initial well 405. The wells may be drilled from any location along the length of the tunnels 401 but are typically spaced in the range of approximately 25 to approximately 150 meters apart. Wells originating from adjacent tunnels may or may not overlap in lateral extent as shown by examples 408 (non-overlapping) and 404 (overlapping). As can be appreciated, wells can be drilled as pairs with one well above the other to form a well pair such as used in SAGD operations. The tunnels 401 which can be curved if necessary to follow the meanderings of a hydrocarbon formation. As can be appreciated, there can be one two or more tunnels which may or may not be connected with cross drifts or wells. In the present invention, all the tunnels and cross drifts are lined; all the wells are sealed where they penetrate the tunnel liners; and when in production, all the wells are connected to a closed piping system such that the produced oil is never exposed to the inside of the tunnel and shaft network.

Enhancing Permeability While Tunneling

Figure 5:
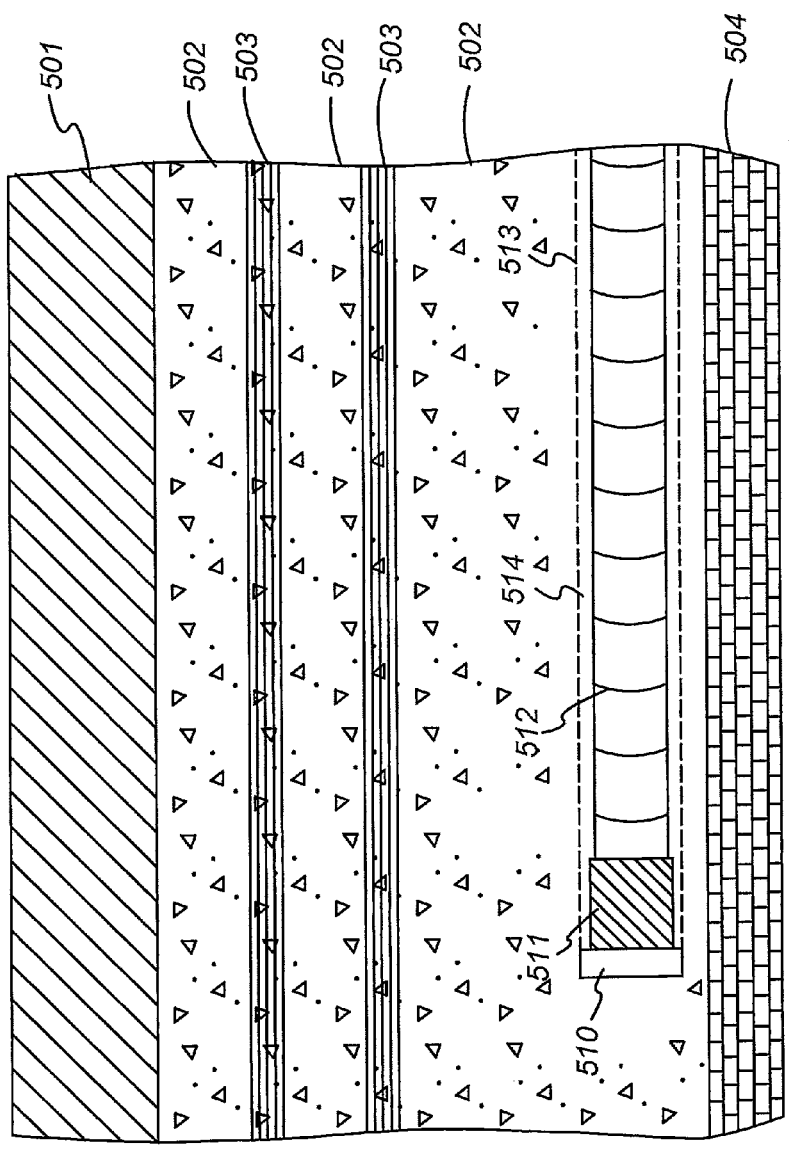
FIG. 5 is a schematic side view of the over-excavating process for enhancing local formation permeability.

The above four figures illustrate how tunnels and wells can be installed in a hydrocarbon formation from an underground workspace. As can be appreciated, wells can be installed in a hydrocarbon formation by drilling from the surface or by drilling from an underground workspace excavated either over or under the hydrocarbon formation. When tunnels forming an underground workspace are located inside the hydrocarbon formation, tunneling techniques themselves may be used to enhance formation permeability FIG. 5 is an idealized schematic side view of some aspects of the present invention. An oil-bearing formation 502 is shown underlain an overlying layer of rock and earth 501 which has a surface 503. The oil deposit 502 lays on top of basement rock 504. A tunnel boring machine ("TBM") is shown near the bottom of the hydrocarbon formation 502. The TBM is comprised of a rotating cutter head 510 and a shield 511. The diameter of the cutter head 510 is larger than the diameter of the shield. The TBM is used to install a fixed tunnel liner 512 which is shown as having a smaller diameter than the TBM shield 511. As a typical example from civil soft ground tunneling, consider a TBM with a cutter head diameter in the range of about 5 to 10 meters. The outer diameter of the shield may be about 25 millimeters to about 100 millimeters smaller in diameter than the cutter head. The liner outer diameter may be about 50 millimeters to about 200 millimeters smaller in diameter than the outer shield diameter. Thus the TBM may over cut the excavation diameter by about 75 millimeters to about 300 millimeters over that of the outer liner diameter. In the example of a 5 meter diameter cutter head, the over-excavation represents a range of about 1.5% to about 6% reduction of the liner outer diameter relative to the diameter of the cutter head. In the example of a 10 meter diameter cutter head, the over-excavation represents a range of about 0.75% to about 3% reduction of the liner outer diameter relative to the diameter of the cutter head. In heavy civil underground construction practice, the amount of over-excavation is related more to actual physical clearances than to a percentage of the cutter head diameter. These clearances between the cutter head and shield and between the shield and the liner allow the TBM to excavate efficiently and these clearances are usually minimized to minimize the amount of grout required to backfill the voids so created. As used in the present invention, these same clearances may be increased or maximized. As the TBM advances, it can be operated to create an excavation whose inside diameter is denoted by 513. A free volume 514 is therefore formed between the inner diameter of the excavation 513 and the outer diameter of the tunnel liner 512. The oil-bearing deposit 502 may now subside into the free volume 514. As is known in the art, the amount of material ingested through the cutter head can be increased by increasing the rotation speed of the cutter head or further opening the ingestion ports on the face of the cutter head or by other well-known means. As can be appreciated, the mass of material ingested through the cutter head can be substantially greater than the mass of material removed to from the opening 513. This will tend to create additional free volume for material around and above the advancing TBM and will result in additional subsidence. This additional subsidence may preferentially occur around the top half of the excavating machine. Thus, clearances between the cutter head and shield and between the shield and the liner as well as the ingestion rate of the cutter head of the TBM may be increased well beyond the values associated with good civil tunneling practice to create conditions for enhanced ground motion which in turn will lead to enhanced permeability primarily because the volume of formation material removed is substantially greater than the volume of the tunnel liner installed.

Figure 6A:
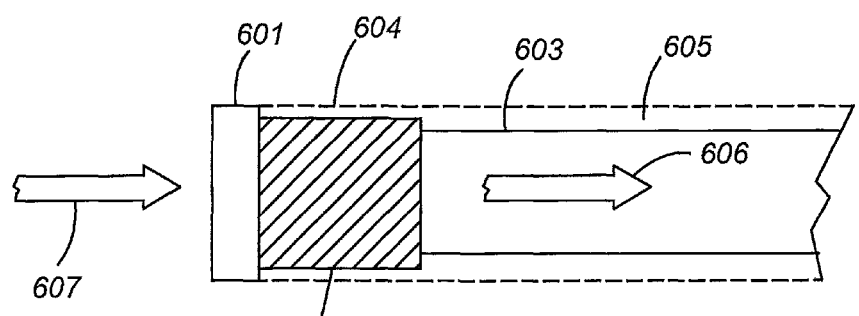
FIGS. 6a and 6b are schematic side views of two modes of operation for over-excavating.
Figure 6B:
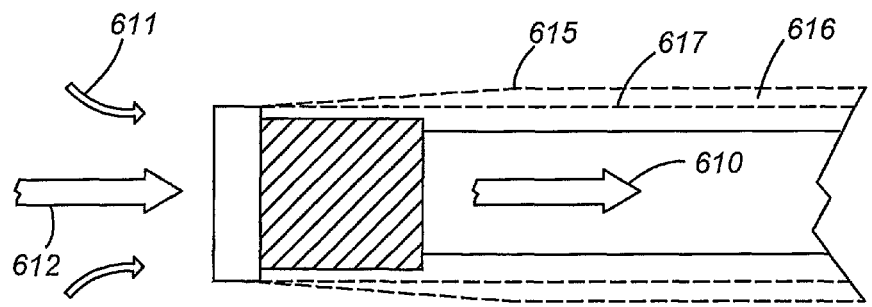

FIG. 6 is a schematic side view of two modes of operation. In FIG. 6a, a TBM comprised of a cutter head 601 and a smaller diameter shield 602 is shown installing a fixed tunnel liner 603 to create an excavation having an initial diameter 604 thus providing a free volume 605. The arrow 606 represents an amount of excavated material that is removed as the TBM advances. The arrow 607 represents an amount of excavated material ingested through the cutter head 601. The size of the arrows represents the mass of material. As can be seen in FIG. 6a, the mass of excavated material that is removed is essentially equal to the mass of material ingested through the cutter head 601. The free volume 605 in FIG. 6a is a result of the difference in diameters between the cutter head 601 and the tunnel liner 603. As illustrated in FIG. 6b, the amount of material ingested through the cutter head can be increased by increasing the rotation speed of the cutter head or further opening the ingestion ports on the face of the cutter head or by other well-known means. This increased ingestion of material can be accomplished without changing the advance rate of the TBM which is controlled by other means. The arrow 610 represents an amount of excavated material that is removed as the TBM advances. The arrows 611 and 612 represent an amount of excavated material ingested through the cutter head. The size of the arrows represents the mass of material. As can be seen in FIG. 6b, the mass of excavated material that is removed remains essentially equal to the mass of material ingested through the cutter head 601. However, the mass of excavated material removed represented by arrow 610 is considerably larger than the mass of excavated material removed represented by arrow 606 in FIG. 6a. The free volume 616 in FIG. 6b is a result of the difference in diameters between the cutter head 601 and the tunnel liner 603 plus the additional material removed by increasing the ingestion rate while maintaining the same TBM advance rate. The free volume 616 in FIG. 6b is composed of the free volume 605 of FIG. 6a plus additional free volume developed by increasing the ingestion rate of the TBM. Either or both of these two means (TBM/liner geometry and cutter head ingestion rate) can be used to create additional free volume for material around and above the advancing TBM and will result in additional controllable amounts of ground motion and subsidence.

FIG. 7 is an schematic end view of the present invention before and after inducing subsidence. In FIG. 7a, a TBM cutter head 704 is shown in end view operating just above a basement formation 705. An oil sand deposit is shown between the basement formation 705 and an overburden layer 702. The ground surface is represented by 701. An impermeable layer of mudstone, siltstone and/or shale 703 is shown separating the upper section of oil sand from the lower section of oil sand. After the TBM has installed a tunnel liner and developed substantial free volume 706 as described in previous figures, the oil sand above the TBM begins to subside into the free volume 706 around the tunnel liner. This subsidence causes the impermeable layer of mudstone, siltstone and or shale 707 to deform and break up. Because the underside of the overlying layer 708 is much further away from the free volume developed by the TBM, it subsides a much lesser amount, deforms but is not breeched. The amount of deformation induced by over-excavating with a TBM is dependent on the geo-technical properties of the reservoir material. The amount could be very small for sandstone or carbonate reservoirs, moderate for oil sands reservoirs and extensive for very sandy reservoirs.

Figure 8:
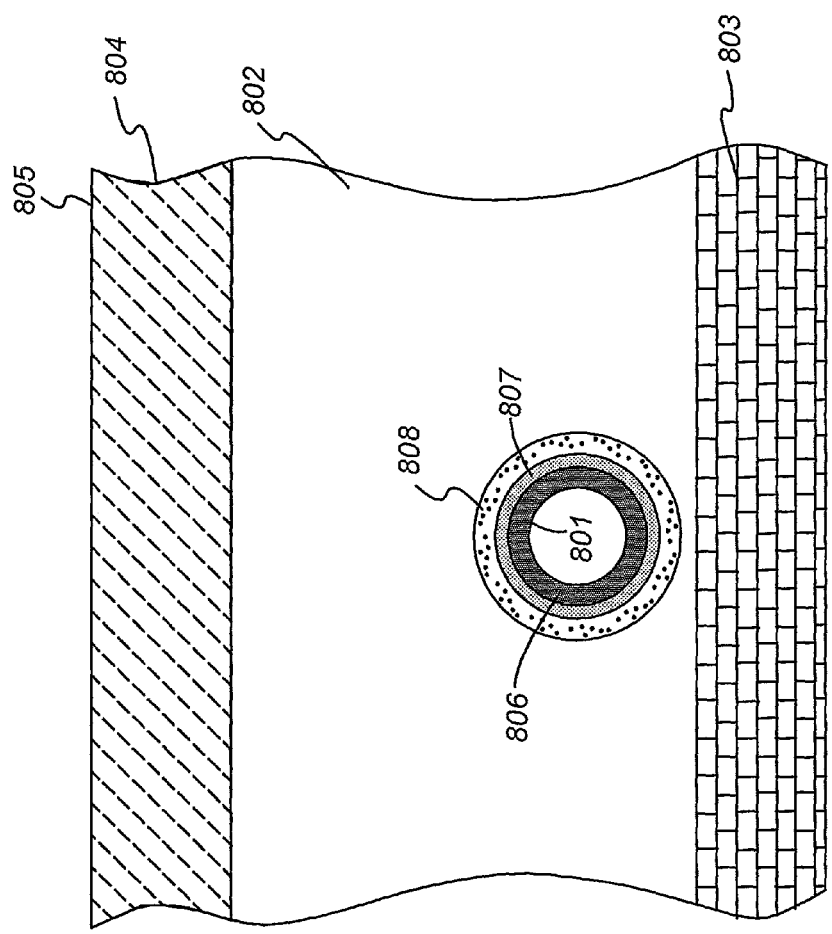
FIG. 8 is a schematic end view of the over-excavating process for enhancing local formation permeability.

FIG. 8 is an end schematic view of the over-excavating process for enhancing local formation permeability. This view shows a tunnel liner 801 installed in a hydrocarbon formation 802. The hydrocarbon formation 802 sits atop an underlying non-hydrocarbon bearing basement formation 803 and is overlain by a non-hydrocarbon bearing formation 804 which reaches to the surface 805. The tunnel liner 801 isolates the interior of the tunnel 806 from the hydrocarbon deposit 802. The tunnel liner may have an optional backfill zone 807 around the liner to provide a permeable zone around the liner 801. The backfill zone is typically formed during the excavating process as part of the excavating and tunnel liner erection process. The backfill may consist of sand, pebbles, small rock and the like. FIG. 8 also shows a disturbed zone 808 around the backfill where subsidence has been induced during the excavating process. This disturbed zone 808 is induced to provide an additional larger zone of enhanced permeability around the tunnel liner. This disturbed zone 808 is not necessarily circular in cross-section as shown but may be approximately elliptical in cross-section with most of the disturbed material being above the spring-line 810 of the tunnel liner cross-section. As can be appreciated the backfill material may be omitted to create more volume for subsidence and ground motion.

Figure 9:
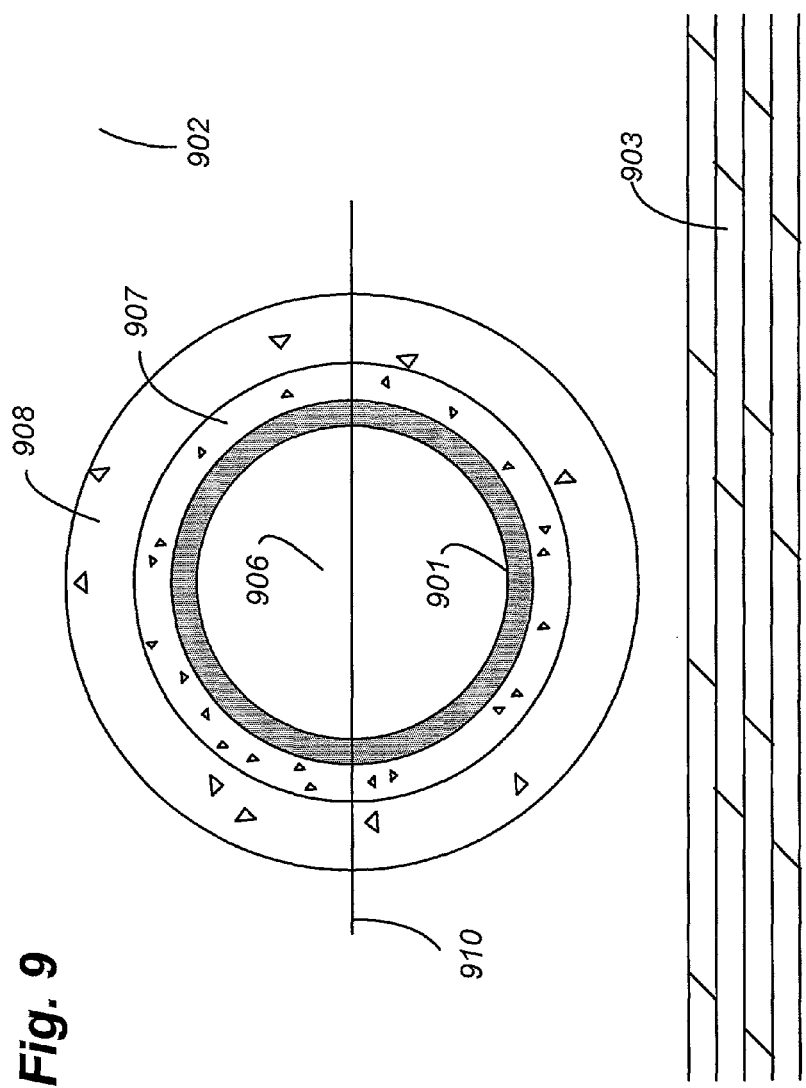
FIG. 9 is a schematic close-up end view of the over-excavating process for enhancing local formation permeability.

FIG. 9 is a close-up end schematic view of the over-excavating process for enhancing local formation permeability. This view shows a tunnel liner 901 installed in a hydrocarbon formation 902. The hydrocarbon formation 902 is shown sitting on or just above an underlying non-hydrocarbon bearing basement formation 903. The tunnel liner 901 isolates the interior of the tunnel 906 from the hydrocarbon deposit 902. The tunnel liner may have an optional backfill zone 907 around the liner to provide a controlled permeable zone around the liner 901. The backfill zone 907 is typically formed during the excavating process as part of the excavating and tunnel liner erection process. The backfill may consist of sand, pebbles, small rock or other suitable materials that are compatible with the formation and produce the required low permeability zone around the liner 901. FIG. 9 also shows a disturbed zone 908 around the backfill zone 907 where subsidence has been induced during the excavating process. This disturbed zone 908 is induced to provide an additional larger zone of enhanced permeability around the optional backfill zone 907 and tunnel liner 901. This disturbed zone 908 is not necessarily circular in cross-section as shown but may be approximately elliptical in cross-section with most of the disturbed material being above the spring-line 910 of the tunnel liner cross-section. As described in FIG. 8, the backfill material in backfill zone 907 may be omitted to create more volume for subsidence and ground motion.

Figure 10:
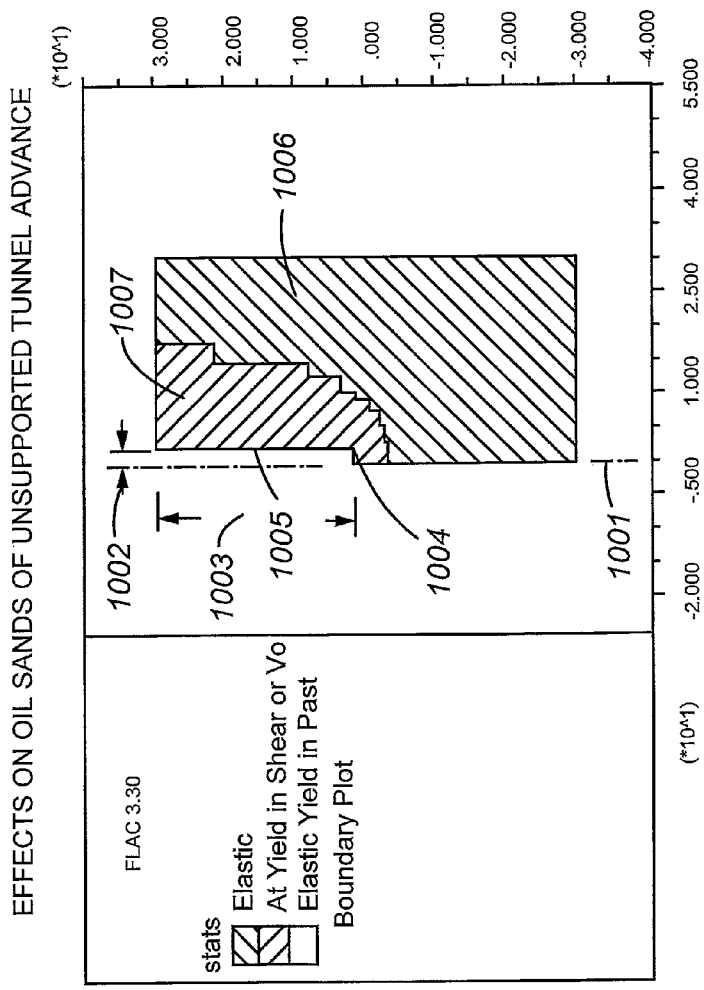
FIG. 10 is a contour plot of a calculation of the effect of over-excavating in oil sands.

FIG. 10 is a contour plot of a calculation to illustrate the effect of over-excavating in oil sands. This calculation was made using a finite difference computer code which can account for time-varying elastic-plastic effects. The calculation included an equation-of-state and a strength model for oil sands that is typical of de-gassed oil sands such as occur around the Athabasca River in Alberta. The calculation shows the mechanical stress state around a tunnel that has been over-excavated in the manner described in prior figures. Oil sand zone 1006 is relatively undisturbed and is an elastic state. Oil sand zone 1007 has been disturbed and has yielded as a result of the tunneling process. The face of the tunnel 1004 (where a TBM is excavating and advancing) is shown as is the unsupported surface 1005 behind the TBM. The radius of the excavation 1002 and the length of the excavation 1003 are also shown. The axis of cylindrical symmetry 1001 for the calculational grid is also shown. This type of calculation gives a quantitative estimate of the effects of an over-excavating process and, as can be appreciated, the results would be dependent on the equation-of-state, strength model and other features used to describe the hydrocarbon formation (such as for example, addition of a gas exsolution model for the bitumen in the oil sand). From this example calculation, it could be inferred that over-excavating a tunnel in this oil sand deposit would cause ground disturbance in the form of plastic yielding and some motion in a volume roughly 4 to 5 tunnel radii from the centerline of the tunnel. Laboratory and/or field experiments would be necessary to determine if these disturbed conditions result in any increase in reservoir permeability.

Enhancing Permeability While Drilling

The methods described below are means of drilling whereby more material is removed than is required to drill a well of the same or slightly larger diameter as the drill bit. In certain reservoir geologies such as for example, weakly cemented sandstones and oil sands, the drilling process can be made to cause the surrounding reservoir material to flake or shed material into the drill hole thus removing even more material. If the density of wells drilled in this manner is high, then this network of over-excavated drill holes can be designed to enhance the general reservoir permeability by providing many pathways of higher permeability. This method of creating permeability is fundamentally different than well-fracturing methods. Well-fracturing methods do not remove reservoir material but create fracture volume essentially by compacting surrounding volumes of reservoir material. The over-excavating means of drilling described herein creates reservoir volume that enhances permeability by removing material and so does not require nearby reservoir material to be compacted and thereby possibly reducing its permeability. Another advantage of drilling to create permeability is that the drill hole can be tightly controlled and placed where desired in the reservoir. Conventional well-fracturing techniques cannot always control where the fractures are driven into the reservoir. As the fracture is driven further from the wellbore, the fracture driving pressure diminishes and eventually the fracture stops or changes direction to follow the local stress gradient of least resistance (typically upward).

Example of Water Jet Drilling

A water jet head can over-excavate a drill hole by jet drilling a hole diameter considerable larger than the drill string and/or drill head diameter. As is well-known, this can be used in reservoir formations that are unconsolidated, loosely consolidated or otherwise weak enough to create an over-excavation condition leading to partial or total collapse of un-excavated material into the well bore once the drill string is withdrawn. This can create a line of increased permeability along the length of the initial drill hole and provide a preferential drainage path from the formation to the well head. This can be accomplished by having jets aimed at the inside walls of the hole or by having a gimbaled jet drill head that can swivel over a 180 degree hemisphere. In either case, the diameter of the excavated well can be made considerably larger than the diameter of the drill string and/or drill head.

Figure 11:
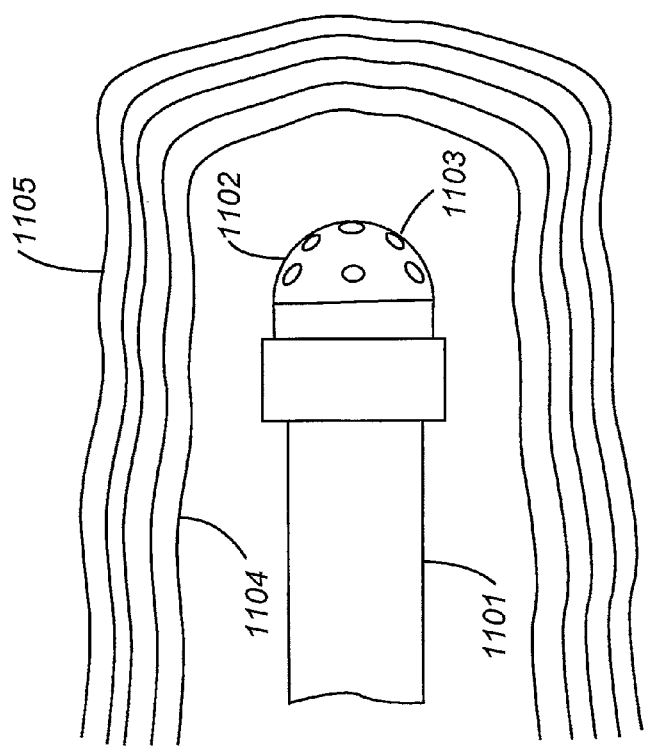
FIG. 11 is a schematic of a typical waterjet drill for over-excavating a well bore.

FIG. 11 is a schematic of a typical water jet drill configuration for over-excavating a well bore. A drill string 1101 is shown attached to a water jet drill head 1102. The jet ports 1103 shown in this example are oriented to simultaneously excavate material from around the hole including from straight ahead to sideways so as to both advance the drill hole and increase its diameter. In a relatively soft material such as for example an oil sand deposit, the water jet can excavate an oversize hole as shown by contour 1104. The contours 1105 beyond the initial hole diameter 1104 represent volumes of decreasing degrees of damage due to the jet drilling process. These damage zones may collapse after the drill string 1101 is withdrawn, may expand but not collapse thereby increasing permeability or may exhibit only a slight increase in permeability, depending on the type of reservoir geology. For example, a carbonate reservoir material may not shown any significant damage, an oil sands reservoir may show significant motion and flaking of material as gases trapped in the bitumen expand to the free surface, and sandy reservoirs may show immediate shedding and collapse into the entire well-bore upon withdrawal of the drill string or reducing drilling mud pressure or removing the drilling mud altogether. In all these example cases, an increase in local permeability should manifest itself or, if not, should manifest itself with time or with modest subsequent well-bore treatment.

Example of Micro-Tunnel Drilling

Drilling well bores by micro-tunneling techniques can achieve an over-excavated drill hole in the same way as described previously for a TBM since a micro-tunneling machine is essentially an un-manned and usually smaller version of a slurry TBM. As described in FIG. 6, the mass of excavated material that is removed by a TBM or micro-tunneler is commonly approximately equal to the mass of material ingested through the cutter head to avoid ground subsidence or hole collapse. As further described in FIG. 6, the amount of material ingested through the cutter head can however be increased by increasing the rotation speed of the cutter head or further opening the ingestion ports on the face of the cutter head or by other well-known means while maintaining the same advance rate. The mass of excavated material that is removed remains essentially equal to the mass of material ingested through the micro-tunneler cutter head. However, the mass of excavated material removed is considerably larger than the mass of excavated material removed at the lower rate of ingestion used for a micro-tunneling machine excavating a well-bore of the same approximate diameter as the micro-tunneler cutter head. Over-excavating will tend to create additional free volume for material around and above the advancing micro-tunneling machine will result in subsidence. As before, this subsidence can enhance permeability of the reservoir material around the drill hole and increase drainage into the well-bore and hence to the well-head.

Example of Underbalanced Rotary Drilling

In conventional open-hole drilling, the wellbore fluid pressure is maintained higher than the local natural formation pressure. With conventional overbalanced drilling, problems include lost circulation, differential sticking, low drilling rates and formation damage such as development of a "skin". In underbalanced open-hole drilling, the wellbore fluid pressure is maintained lower than the local natural formation pressure, thus permitting the formation fluids to tend to flow towards the wellbore while drilling. Underbalanced drilling is considered, in many drilling situations, to reduce the problems associated with overbalanced drilling. The primary value of underbalanced drilling is to minimize formation damage. Four techniques are currently available to achieve underbalanced drilling conditions. These include using lightweight drilling fluids, injecting gas down the drill pipe, injecting gas into a parasite string, and use of foam. Negative differential pressure between the formation and the wellbore may stimulate the production of some formation fluids and gasses during drilling thus tending to prevent the build-up of a filter cake in the wellbore. During conventional drilling, this filter cake acts as a protective barrier, reducing damage to formation permeability from drill cuttings. When drilling wellbores, the action of the drill bit produces drill cuttings that are typically sand size or smaller (silt or clay). In conventional drilling, if the wellbore does not have a filter cake and becomes overbalanced, these finer drilling cuttings may be carried into the formation and reduce near-wellbore permeability. If an underbalanced region develops a near-wellbore region of reduced permeability, the damaged region can significantly reduce the potential production rate unless counter measures are taken. Underbalanced drilling is not considered appropriate for most shales, unconsolidated sections and chalk.

Figure 12B:
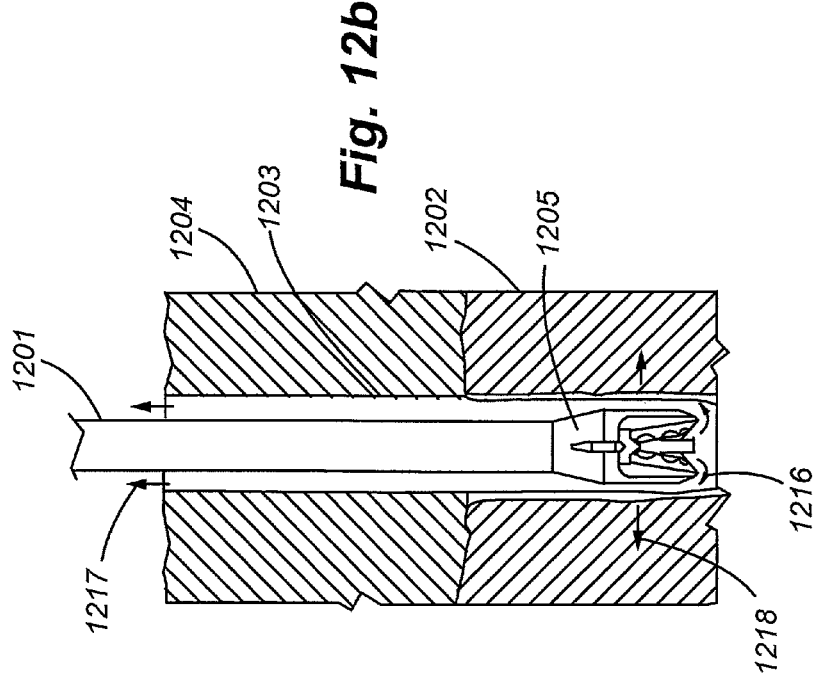
FIGS. 12a and 12b are schematic of methods for enhancing local permeability by underbalanced drilling.
Figure 12A:
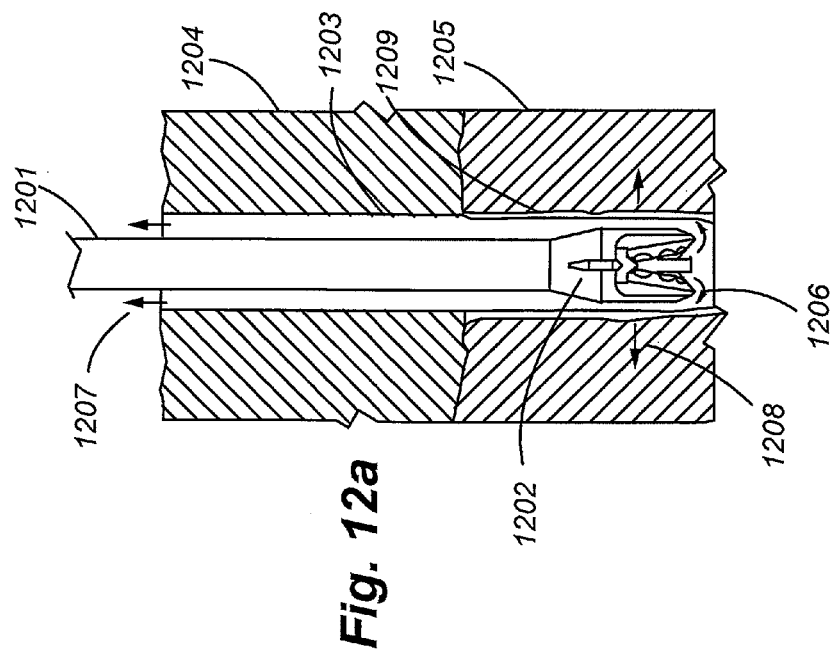

FIG. 12 is a schematic illustration of a method of enhancing local permeability by underbalanced drilling in certain formations. In FIG. 12a, a drill rod 1201 with a rotary drill bit 1202 is shown drilling a well bore 1203, passing, for example, from a barren formation 1204 to a hydrocarbon formation 1205. In this example, the pressure of the drilling fluid is greater than the pressure in the local formations. This is the basic configuration for conventional overbalanced drilling technique. FIG. 12a illustrates the fluid flows in conventional overbalanced drilling. Drilling mud flows from the drill bit 1202 as indicated by arrows 1206 and returns via the well bore 1203 as shown by arrows 1207 towards the drilling rig. Drilling fluid typically forms a mudcake 1209 on the surface of the well bore 1203 and may allow some drilling fluid to penetrate into the formation 1208 as indicated by arrows 1207. This flow into the formation sometimes slightly diminishes the amount of drilling mud in the return flow and sometimes becomes so great as to cause loss of drilling mud circulation. For comparison, FIG. 12b illustrates the fluid flows in underbalanced drilling where the pressure of the drilling fluid is less than the pressure in the local formations. Drilling mud flows from the drill bit 1202 as indicated by arrows 1216 and returns via the well bore 1203 as shown by arrows 1207 towards the drilling rig. Formation fluids, if they flow at all, flow towards the well bore 1203 as shown by arrows 1218, and join the return flow of drilling mud.

While underbalanced drilling has been developed to minimize well bore damage and prevent reduced local permeability, underbalanced drilling may be used in contradiction to its intended purposes in reservoir formations that are unconsolidated, loosely consolidated or otherwise weak to create an over-excavation condition leading to partial or total collapse of un-excavated material into the well bore once the drill string is withdrawn. This can create a zone of increased permeability in the collapsed material along the length of the initial drill hole and provide a preferential drainage path from the formation to the well head. As can be appreciated, a well can be drilled with the drilling fluid at a balanced or overbalanced pressure, the drill string can be withdrawn and the pressure of the fluid in the well can be reduced to an underbalanced condition. In some geologies, such as loosely cemented sandstones and oil sands for example, this may allow the hole to collapse along the length of the drill hole after the drill string has been withdrawn and subsequently provide a preferential drainage path from the formation to the well head.

A well in some geologies, such as loosely cemented sandstones and oil sands for example, can be drilled in a highly overbalanced condition to create a damage zone around the well bore. When the drill string is withdrawn and the pressure of the fluid in the well removed, this action may allow the hole to collapse along the length of the drill hole because of the formation damage caused by the highly overbalanced drilling fluid pressure and may be another means of providing an enhanced preferential drainage path from the formation to the well head.

Enhancing Vertical Permeability

Hydrocarbon reservoirs in sandstones or carbonates may have permeabilities parallel to the bedding planes in the range of a few tens of millidarcies to several hundred millidarcies. Permeabilities vertical to the bedding planes are in the same range but in addition there may be impermeable layers (impermeable taken here as less than about 5 millidarcies) parallel to the bedding planes that prevent continuous vertical flow of fluids.

The permeability of oil sands is typically in the range of a few hundred darcies to several darcies. However the permeability vertical to the bedding planes of an oil sands reservoir may be disrupted by impermeable layers of, for example, mudstone and shale. The permeability of these barrier layers is typically in the range of a few millidarcies or less. These layers may be a few centimeters to several centimeters thick and can form an impermeable barrier to hydrocarbon production. Alternately, these layers may not be continuous but may be comprised of many thin layers in a sequence that can form a labyrinth that has the same blocking effect as a continuous impermeable membrane.

The following is an example how of how a dense network of wells may be drilled upwards and through a reservoir containing one or more impermeable horizontal barriers so as to enhance the general vertical permeability of the reservoir. As can be appreciated there are many drilling patterns that can be applied to achieve this and most patterns will be dependent on the reservoir geology and dip angle of the parallel beds.

Figure 13:
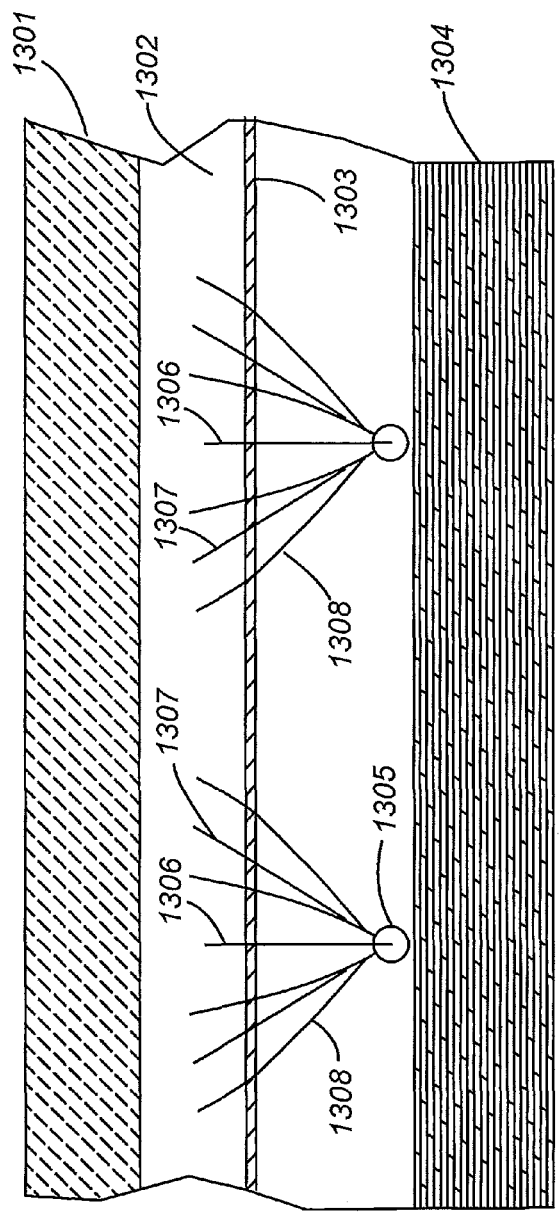
FIG. 13 is a schematic end view of an example of a dense network of wells to enhance vertical permeability.

FIG. 13 is a schematic end view of an example of a network of inclined wells to enhance vertical permeability. Two tunnels 1305 are shown near the bottom of a hydrocarbon formation 1302 along with an overburden layer 1301 and an underlying basement formation 1304. An impermeable bedding layer 1303 is shown between the upper portion of the hydrocarbon deposit 1302 and the lower portion of the hydrocarbon deposit 1302. Wells 1306 and 1307 are shown drilled from the tunnels 1305 into the hydrocarbon formation 1302 such that they pierce the impermeable layer 1303. Additional off-shoot wells 1308 are shown drilled from main wells 1307 into the hydrocarbon formation 1302 such that they also pierce the impermeable layer 1303. For a dense network of such wells, mobile hydrocarbons can flow approximately parallel to the bedding planes which include the impermeable layer 1303 until they encounter a well that pierces the impermeable layer 1303. The mobile hydrocarbons can then flow via the piercing wells downward into the lower portion of the hydrocarbon deposit 1302 where they can eventually be collected from the wells 1306, 1307 and 1308 or flow through the lower portion of the hydrocarbon deposit 1302 until they encounter other producer wells (not shown), including horizontal producer wells (also not shown). Wells 1306, 1307 and 1308 may or may not be cased and perforated, depending on the local geology and operator preference. As can be appreciated, there can be several impermeable layers that can be breached in the same way. In the case of dipping bedding planes, hydrocarbons will tend to flow down dip until they encounter such wells as wells 1306, 1307 and 1308.

Figure 14:
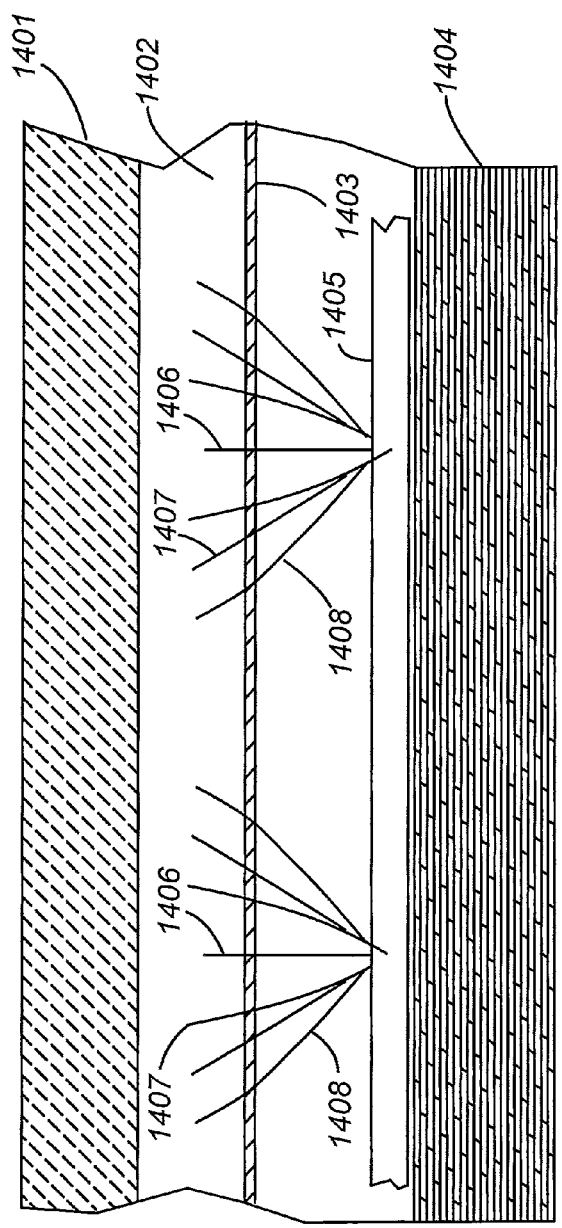
FIG. 14 is a schematic side view of an example of a dense network of wells to enhance vertical permeability.

FIG. 14 is a schematic side view of an example of a dense network of wells to enhance vertical permeability such as also illustrated in FIG. 13. A tunnel 1405 is shown near the bottom of a hydrocarbon formation 1402 along with an overburden layer 1401 and an underlying basement formation 1404. An impermeable bedding layer 1403 is shown between the upper portion of the hydrocarbon deposit 1402 and the lower portion of the hydrocarbon deposit 1402. Wells 1406 and 1407 are shown drilled from the tunnel 1405 into the hydrocarbon formation 1402 such that they pierce the impermeable layer 1403. Additional off-shoot wells 1408 are shown drilled from main wells 1407 into the hydrocarbon formation 1402 such that they also pierce the impermeable layer 1403. This side view, along with the end view of FIG. 13, illustrates that, if a large number of wells can be installed throughout the reservoir 1402, they can act to increase vertical permeability of the reservoir in the presence of one or more impermeable bedding planes 1403 by providing permeable channels through the impermeable beds until the flowing hydrocarbons can be collected directly or encounter other producer wells connected to the tunnel 1405. The flow of hydrocarbons is aided by both gravity and the pressure gradient that promotes flow from the reservoir toward wells that are typically at a lower pressure than the prevailing reservoir pressure.

Enhancing General Permeability

Figure 15:
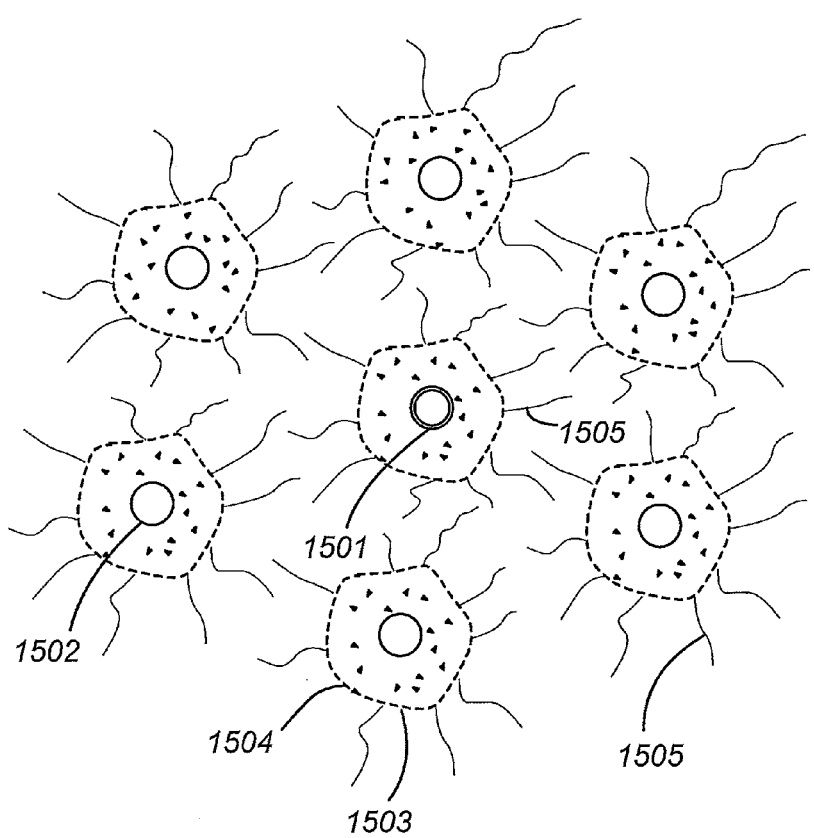
FIG. 15 is a schematic end view of a cluster of holes for enhancing permeability.

FIG. 15 is a schematic end view of a cluster of holes for enhancing permeability. The wells shown in FIGS. 13 and 14 may be drilled in a conventional fashion or they may be over-excavated so that the formation immediately surrounding the wells becomes more permeable because of the removal and subsequent collapse of material and/or because of subsequent well-fracturing techniques such as, for example, hydraulic fracturing. The wells shown in FIG. 15 are all drilled by one of the over-excavating methods described in previous sections. FIG. 15 shows a central well 1501 that may be cased. The other wells 1502 are preferably uncased. Each well is shown surrounded by a zone 1504 where reservoir material has moved because of over-excavation. If the wells such as wells 1502 are uncased, reservoir material may partially or completely collapse into the well-bore after the drill bit or drill head has been withdrawn. The movement of reservoir material may cause fractures 1505 to be propagated way from the zones 1504. These fractures form a fracture network that may or may not coalesce with fractures from adjacent wells. The net result is that the reservoir volume containing the wells 1501 and 1502, the zones 1504 and the fracture 1505 is more permeable than reservoir volume was prior to being drilled as shown. This enhancing of permeability can be further promoted by subsequently applying conventional well-fracturing techniques such as for example hydraulic fracturing to the central well 1501. Depending on the geology, wells may be in the range of about 3 to 15 well-bore diameters from adjacent wells (where the well-bore diameter is taken as the drill bit diameter used to drill the well).

Figure 16:
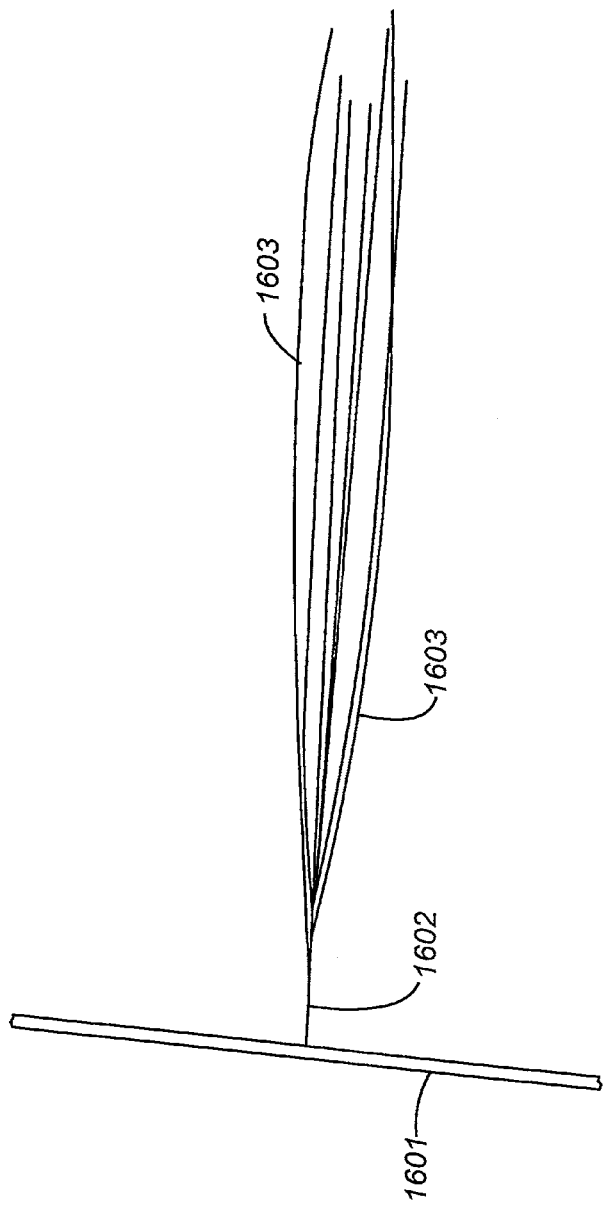
FIG. 16 is a schematic plan view of a cluster of holes for enhancing permeability.

FIG. 16 is a schematic plan view of a cluster of approximately horizontal holes for enhancing permeability. A main well 1602 is drilled into the reservoir from tunnel 1601 as described for example in FIG. 15. Off-shoot wells 1603 are drilled out from the main well 1602 to form an approximately parallel group of wells with a cross-sectional configuration similar to that shown in FIG. 15.

There are other advantages of the present invention not discussed in the above figures. For example, wells may be rapidly drilled using over-excavation techniques and allowed to collapse over time (such as may occur in oil sands where gases in the bitumen or heavy oil expand and cause the reservoir matrix material to expand into the well-bore) forming permeable pathways of loose unconsolidated material that are considerably more permeable than the undisturbed hydrocarbon formation. In other words, by removing material during the drilling process, a system of permeable pathways may be formed where the reservoir engineer desires and this may be a more preferable process by which to create fractures than conventional fracturing methods which don't remove material and whose trajectories through the formation are not fully controllable.

A number of variations and modifications of the invention can be used. As will be appreciated, it would be possible to provide for some features of the invention without providing others. The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for extracting hydrocarbons, comprising:
    (a) providing a first underground excavation in proximity to a hydrocarbon-containing deposit; and
    (b) forming, from the first underground excavation, a second underground excavation, the second underground excavation being designed to at least partially cave in to increase a permeability of at least one of the hydrocarbon-containing deposit and an adjacent hydrocarbon-barren deposit, wherein the forming step (b) comprises the following sub-step:

forming, in the second underground excavation a liner, the liner defining interior and exterior portions of the second underground excavation, the exterior portion being located exteriorly of the liner, being a free volume, and being positioned between the liner and an interior surface of the second excavation, at a selected location an area of the exterior portion being at least about 2% of an area of the second underground excavation, wherein the exterior portion is maintained substantially free of a backfill material before subsidence of surrounding rock, wherein the hydrocarbon-containing formation is oil sands, wherein the area ranges from about 2 to about 22% of the area of the second underground excavation, wherein after subsidence of the rock into the exterior portion a zone of disturbance has a diameter that is at least about 200% of the diameter of the second excavation, wherein the second underground excavation is formed by a tunnel boring machine, the tunnel boring machine comprising a rotating cutter head having a first diameter and shield having a second diameter, wherein the liner is assembled under the shield, wherein the liner has a third diameter, wherein the second diameter is from about 25 to about 100 millimeters smaller than the first diameter, and wherein the third diameter is from about 50 to about 200 millimeters smaller than the second diameter, wherein the surrounding rock is part of at least one of the hydrocarbon-containing and a hydrocarbon-barren deposit.

2. The method of claim 1, wherein the first underground excavation is formed by the tunnel boring machine and includes the liner separated from a surface of the first underground excavation by the free volume and wherein the ingestion rate of excavated material through the rotating cutter head of the tunnel boring machine is greater than the ingestion rate of excavated material through the rotating cutter head required to form each of the first and second underground excavations.

3. A method for extracting hydrocarbons, comprising:
(a) providing a first underground excavation in proximity to a hydrocarbon-containing deposit; and
(b) forming, from the first underground excavation, a second underground excavation, the second underground excavation being designed to at least partially cave in to increase a permeability of at least one of the hydrocarbon-containing deposit and an adjacent hydrocarbon-barren deposit, wherein the forming step (b) comprises the following sub-step:

forming, in the second underground excavation a liner, the liner defining interior and exterior portions of the second underground excavation, the exterior portion being located exteriorly of the liner, being a free volume, and being positioned between the liner and an interior surface of the second excavation, at a selected location a diameter of the interior portion being at least about 88% of a diameter of the second underground excavation, wherein the exterior portion is maintained substantially free of a backfill material before subsidence of the surrounding rock, wherein the hydrocarbon-containing formation is oil sands, wherein the diameter of the interior portion ranges from about 88 to about 99% of the diameter of the second underground excavation, wherein the second underground excavation is formed by a tunnel boring machine, the tunnel boring machine comprising a rotating cutter head having a first diameter and shield having a second diameter, wherein the liner has a third diameter, wherein the second diameter is from about 96% to about 99.7% of the first diameter, wherein the third diameter is from about 91.7% to about 99.3% of the second diameter, and wherein, after the second underground excavation at least partially caves in, a zone of disturbance substantially surrounds the second underground excavation and wherein a diameter of the zone of disturbance is at least about 200% of a diameter of the second excavation, wherein the surrounding rock is part of at least one of the hydrocarbon-containing and a hydrocarbon-barren deposit.

4. A method for extracting hydrocarbons, comprising:
(a) providing a first underground excavation in proximity to a hydrocarbon-containing deposit; and
(b) forming, from the first underground excavation, a second underground excavation, the second underground excavation being designed to at least partially cave in to increase a permeability of at least one of the hydrocarbon-containing deposit and an adjacent hydrocarbon-barren deposit, wherein the forming step (b) comprises the following sub-step:

forming, in the second underground excavation at least one of a liner and casing, the at least one of a liner and casing defining interior and exterior portions of the second underground excavation, the exterior portion being located exteriorly of the at least one of a liner and casing, being a free volume, and being positioned between the at least one of a liner and casing and an interior surface of the second excavation, at a selected location a diameter of the interior portion being at least about 88% of a diameter of the second underground excavation, wherein the exterior portion is maintained substantially free of a backfill material before subsidence of the surrounding rock, wherein the diameter of the interior portion ranges from about 88 to about 99% of the diameter of the second underground excavation, wherein the second underground excavation is formed by a tunnel boring machine, the tunnel boring machine comprising a rotating cutter head having a first diameter and shield having a second diameter, wherein after subsidence of the rock into the exterior portion a zone of disturbance has a diameter that is at least about 200% of the diameter of the second excavation, wherein the liner has a third diameter, and wherein the third diameter is the diameter of the interior portion, wherein the surrounding rock is part of at least one of the hydrocarbon-containing and a hydrocarbon-barren deposit.

5. A method for extracting hydrocarbons, comprising:
(a) providing a first underground excavation in proximity to a hydrocarbon-containing deposit; and
(b) forming, from the first underground excavation, a second underground excavation, the second underground excavation being designed to at least partially cave in to increase a permeability of at least one of the hydrocarbon-containing deposit and an adjacent hydrocarbon-barren deposit, wherein the forming step (b) comprises the following sub-step:

forming a plurality of second underground excavations at spacings of about 3 to about 15 wellbore diameters from an adjacent second underground excavation followed by maintaining each of the second underground excavations free of a casing to induce subsidence of the surrounding rock, wherein the hydrocarbon-containing formation is oil sands, wherein the second excavation is a drill hole, and wherein the drill hole is without a casing, wherein the surrounding rock is part of at least one of the hydrocarbon-containing and a hydrocarbon-barren deposit.

6. The method of claim 5, wherein the forming step (b) comprises the sub-step: forming the second underground excavation by maintaining a wellbore fluid pressure equal to or greater than a local formation pressure and, when the second excavation is completed, maintaining a wellbore fluid pressure lower than the local formation pressure while maintaining the second excavation free of a casing to induce subsidence of the surrounding rock, wherein the hydrocarbon-containing formation is oil sands, and further comprising:

(c) forming, from at least one of the first and second excavations, a plurality of further underground excavations, at least a one of the further excavations being cased and the remainder of the further excavations being uncased to cave-in and the cased further excavation being substantially surrounded by the uncased further excavations, whereby a permeability of the at least one of the hydrocarbon-containing and hydrocarbon-barren deposit in the vicinity of the cased further excavation is increased by the caving in of the uncased further excavations.

7. A method for removing hydrocarbons from a hydrocarbon-containing deposit, comprising:

(a) forming a plurality of drill holes from an underground excavation, the drill holes penetrating a hydrocarbon-containing deposit, wherein a first set of the drill holes are cased and a second set of the drill holes are uncased;

(b) maintaining the second set of drill holes uncased, thereby enabling the second set of drill holes to at least partially cave in to provide increased permeability in the vicinity of at least one hole in the first set of drill holes; and (c) after the second set of drill holes have at least partially caved in, removing hydrocarbons from the deposit via the at least one hole in the first set of drill holes.

8. The method of claim 7, wherein the spacings between holes in the second set of drill holes ranges from about 3 to about 15 wellbore diameters, wherein at least some of the second set of drill holes are positioned in the vicinity of the at least one hole in the first set of drill holes, whereby, when the at least some of the second set of drill holes cave in, the permeability in the deposit adjacent to the at least one of the first set of drill holes is increased.

* * * * *